United States Patent [19]

Clark

[11] Patent Number: 5,704,669
[45] Date of Patent: Jan. 6, 1998

[54] PORTABLE TREE SWING SYSTEM

[75] Inventor: L. Charles Clark, Salt Lake City, Utah

[73] Assignee: Tree Play LLC, Salt Lake City, Utah

[21] Appl. No.: 680,488

[22] Filed: Jul. 15, 1996

[51] Int. Cl.$^6$ .................................................. B25J 1/00
[52] U.S. Cl. ............................................ 294/19.1; 294/24
[58] Field of Search ........................... 294/19.1, 24, 74, 294/82.11; 472/118, 121, 122; 114/221 R, 230; 289/17, 18.1

[56] References Cited

U.S. PATENT DOCUMENTS

| | | | |
|---|---|---|---|
| 1,870,784 | 8/1932 | Ramey | 472/118 |
| 2,591,638 | 4/1952 | Traftou | 294/19.1 |
| 2,688,510 | 9/1954 | Heyser | 294/19.1 |
| 2,700,252 | 1/1955 | Paganelli | 294/19.1 |
| 2,813,736 | 11/1957 | Archer et al. | 294/19.1 |
| 3,072,429 | 1/1963 | Stipan | 294/19 R |
| 3,352,555 | 11/1967 | Phillips | 472/118 |
| 3,774,953 | 11/1973 | Babcock | 294/19 R |
| 3,813,122 | 5/1974 | Wemyss | 294/19 R |
| 3,826,492 | 7/1974 | Hagan | 272/85 |
| 3,856,340 | 12/1974 | Faulkner | 294/19 R |
| 3,937,463 | 2/1976 | Solsson | 272/85 |
| 4,557,214 | 12/1985 | Molitor | 114/221 R |
| 4,635,986 | 1/1987 | Johus | 294/19.1 |
| 4,895,407 | 1/1990 | Mozer | 294/19.1 |
| 5,054,829 | 10/1991 | Olsen | 294/19.1 |
| 5,116,260 | 5/1992 | Upchurch | 114/221 R |
| 5,174,057 | 12/1992 | Sienel | 43/5 |
| 5,292,160 | 3/1994 | Deichman | 294/19.1 |
| 5,415,446 | 5/1995 | Olsou et al. | 294/19.1 |
| 5,427,575 | 6/1995 | Berk | 472/118 |
| 5,494,326 | 2/1996 | Hinds | 294/19.1 |

OTHER PUBLICATIONS

Solid Natural Wood Swing 1996 Lillian Vernou Corp. Catalog—vol. 613.
Hammock Chair, Net Chair No Date Unique Simplicities Inc. Gardiner NY 12525–5608.
Sky Chair No Date Sky Boulder, CO 80302.

*Primary Examiner*—Dean Kramer

[57] ABSTRACT

A hoist line placing device 20, a support cable assembly 50, and a method whereby the support cable assembly is remotely attached to and removed from an out-of-reach overhead object. The hoist line placing device comprises a rigid, elongated, telescopic, tubular pole 21 with a hoist line 30 coaxially threaded through it from bottom to top, and with the free end of the hoist line attached to a closable fastener 40. A supply of hoist line 30 is wound on a line storage device or spool 31 disposed at or near the bottom end of the tubular pole. The support cable assembly comprises a running loop collar 51 connected to the top end of a support cable 60, with a retrieval cable 70 also connected to the support cable at a predetermined position below the running loop collar. The method by which the support cable assembly is used comprises the following steps: (a) placing the hoist line over an overhead object; (b) attaching one end of the hoist line to the bottom end of the support cable; (c) hoisting the support cable over the overhead object until the running loop collar is disposed at eye level; (d) threading the hoist line through the running loop collar to form a running closed loop around the overhead object; and (e) tightening the running closed loop around the overhead object; and thereafter (f) removing the support cable assembly from the overhead object by pulling down on the retrieval cable until the running closed loop comes apart and the support cable assembly falls to the ground.

18 Claims, 16 Drawing Sheets

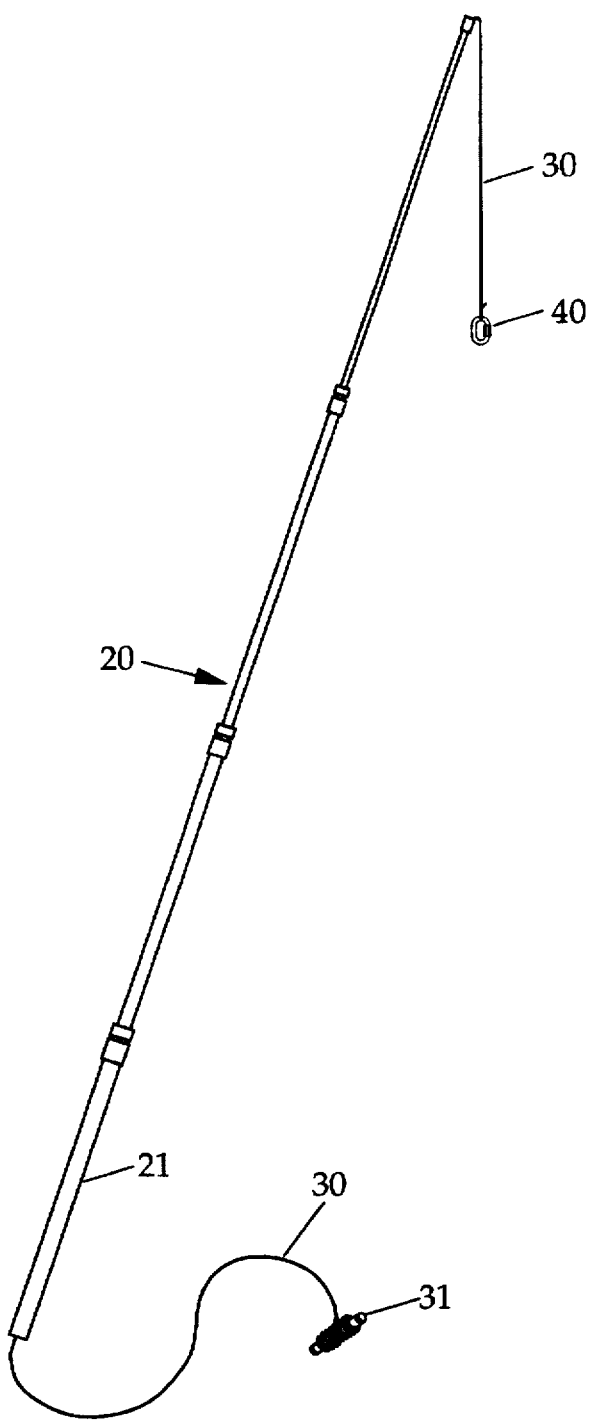
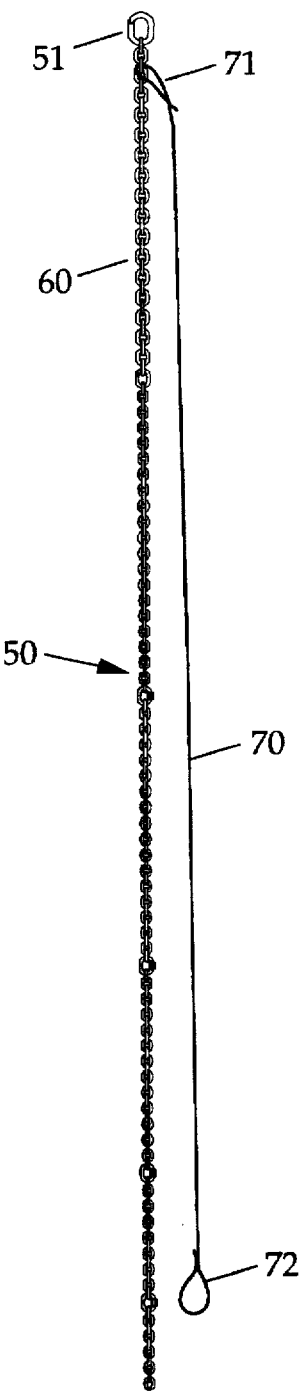
Fig. 2A
Fig. 2B

PORTABLE TREE SWING SYSTEM

BACKGROUND—FIELD OF INVENTION

This invention relates to the means and methods for hanging a tree swing. Specifically, the invention includes a support cable for a portable tree swing system, a hoist line placing device, and methods for installing the support cable on an out-of-reach overhead object, such as high tree branch, and later removing it therefrom.

BACKGROUND—DESCRIPTION PRIOR ART

The term "tree swing" as used herein applies to swings, swing-like amusement devices, and articles of hanging furniture which are designed to be suspended from an overhead object, such a tree branch, or which may be readily adapted thereto. The term "portable tree swing" as used herein applies only to a tree swing which may be easily carried by one person, and quickly (i.e., in a few minutes) installed on and removed quickly from an out-of-reach overhead object, such as a tree branch, by an adult human standing on the ground. Because there is very little in the prior art relative to portable tree swings, the scope of this discussion must necessarily be broadened to consider permanently installed tree swings. Therefore, the present discussion primarily reviews the prior art for the installation of permanent tree swings, and evaluates this prior art in light of its applicability to a portable tree swing system.

Permanently installed tree swings are commonplace. While most of these tree swings are homemade, a few tree swing products are commercially available. One example is a Solid Natural Wood Swing from Lillian Vernon Corp. (1996 Catalog Vol. 613) which is designed to hang from a tree branch up to about 12 feet high. This swing is installed by throwing two 20 ft. support ropes over a tree branch and attaching both ends of each rope to the swing seat. Another example is a plastic saucer swing from The Little Tikes Company, Hudson, Ohio 44236, which is designed to be suspended with a single rope. One end of the rope is attached to a tree branch and the other end is attached to the saucer seat. These examples are typical of commercially available installation-ready tree swings, i.e., products which are designed for installation on low-hanging branches and are intended to be used by small children. There appear to be no commercially available tree swing products which are designed to be installed on very high tree branches and to accommodate adults as well as children. Furthermore, none of the commercial tree swing products which I have encountered is designed or intended for use as a portable tree swing. My portable tree swing system provides a portable swing which can be easily installed on very high tree branches and can be used by people of all ages.

Attaching Support Cables to a Tree Branch

A tree swing is suspended by one or more support cables attached to an overhead tree branch. Support cables are typically constructed from zinc-plated steel chain, galvanized steel cable, ropes and straps made from natural or synthetic fibers, or elastic tubing. The methods for attaching a support cable to a tree branch can be subdivided into two general categories: methods for anchoring a support cable to the underside of a tree branch, and methods for fastening one end of a support cable around a tree branch.

An eye bolt is typically used for anchoring the support cables of swing-like amusement devices or hanging furniture such as hammock chairs and hanging chairs. Examples of such products include the Hammock Chair and Net Chair from Unique Simplicities Inc. (Gardiner, N.Y. 12525-5608) and the Sky Chair from Sky (Boulder, Colo. 80302). Such products are typically intended for installation in an indoor or covered outdoor space, but some manufacturers also suggest fastening the eye bolt to the underside of a tree branch. Another anchor for support cables is disclosed in Swiss patent 443,486 to Reinhard (1968) comprising a two-part metal bracket which is bolted around a tree branch. One or more support cables may be attached to the bottom of the bracket. Such metal brackets and eye bolts require tools and considerable effort to install and remove, rendering them impractical for use with portable tree swings. My portable tree swing system obviates the use of such anchors for attaching a support cable to a tree branch.

In general, the methods for fastening a support cable around a tree branch involve wrapping one end of the support cable around the branch and fastening the cable to itself, forming a simple closed loop around the branch as shown in FIG. 1A. However, the specific fastening method depends on the support cable material. Steel chain is typically fastened around a branch using any of the variety of common replacement links (i.e., lap link or quick link) or clip fasteners (i.e., safety spring link or carabiner). Steel cable is typically fastened around a tree branch by attaching it to itself with at least two cable clamps. Rope is usually fastened around a tree branch with a knot. All such methods present problems which make them inappropriate for use with portable tree swings. Using these simple closed loop methods, support cables may only be installed on tree branches which are within reach. In addition, it is difficult to form a simple closed loop which is tight enough to prevent the support cable from slipping on the tree branch. When weight is applied to the support cable, a simple closed loop tends to stretch and loosen, allowing it to slip rotationally around the branch. Slipping causes abrasion between the cable and the branch which can girdle the bark and kill the branch, wear out the support cable, or both. Some inventors have attempted to substitute simple closed loop methods with open loops, as shown in FIG. 1B. U.S. Pat. No. 5,427,575 to Berk (1995) and U.S. Pat. No. 3,352,555 to Phillips (1967) show a support cable simply looped over (i.e., not wrapped around) a tree branch in an open loop, with both ends of the support cable connected to a swing seat. This method exacerbates the problem of slipping and abrasion between the support cable and branch. Allowing such abrasion during the use of any tree swing, whether portable or permanently installed, is unsafe and unnecessary. U.S. Pat. No. 3,937,463 to Soisson (1976) eliminates the slipping and abrasion problem by looping a rope around the tree branch "in a plurality of securing loops" before connecting both ends to a swing seat. However, this is method is unnecessarily complex, and is obviated by my portable tree swing system.

The best method for fastening a support cable around a branch is with a running closed loop as illustrated in FIG. 1C. A running closed loop method is described in *Playhouses You Can Build* by David and Jeanie Stiles, p. 113. One end of a rope is tied in a bowline knot, forming a small loop, and is passed over the tree branch. The free end of the rope is then threaded through the small loop, forming a running closed loop which can be tightened around the branch. U.S. Pat. No. 1,870,784 to Ramey (1932) illustrates a running closed loop formed with a steel chain. While not explicitly described, the following method is implied. A steel ring is attached to one end of the chain and passed over the branch. Then the free end of the chain is threaded through the ring, forming a running closed loop around the branch.

Similarly, a running closed loop can be formed with a steel cable by making a small loop on one end of cable and securing it with cable clamps. The looped end of the cable is passed over the branch and the free end of the cable is threaded through the small loop to form a running closed loop. Another variation is shown in U.S. Pat. No. 3,826,492 to Hagan (1974). A continuous loop of elastic tubing is draped over a tree branch so half of the loop hangs from each side of the branch. The half of the loop hanging from one side of the branch is passed through the half of the loop hanging from the other side, forming a running closed loop.

A running closed loop solves several problems. Forming a running closed loop is a much simpler operation than installing an anchor on a tree branch. A running closed loop is as secure as any anchor, but is easily removed and leaves no permanent fixture on the tree branch. A running closed loop is self-tightening and allows no slipping and abrasion, thus eliminating the need to use simple closed loops or Soisson's complicated method of looping a rope around the tree branch "in a plurality of securing loops". Previous to my portable tree swing system, only permanently installed tree swings have used the running closed loop method. My portable tree swing system incorporates a running closed loop and the benefits thereof as part of a portable tree swing system.

Reaching Very High Tree Branches

The running closed loop method is easily applied to branches which are within reach while standing on the ground. However, tree swings are more enjoyable when suspended from very high tree branches. Unfortunately, it is very difficult to install a support cable on such branches. The prior-art methods for reaching very high branches to install a support cable include throwing the support cable over the branch from below, using a ladder, climbing the tree, or passing the rope over the branch with a pole-mounted device.

Throwing Methods

An adaptation of the running closed loop method for out-of-reach tree branches is described in *Playhouses You Can Build* by David and Jeanie Stiles, p. 113. The looped end of a rope is thrown over a tree branch from below. If necessary, a weight is attached to the looped end to make it descend from the tree branch more easily. Once the looped end drops within reach, the free end is threaded through it to form a running closed loop. The free end is then pulled to tighten the running closed loop around the branch. While the rope throwing method is ideal for branches just a few feet beyond reach, throwing the rope gets harder and trickier as the height of the branch increases as illustrated in the following two examples.

In the first example, consider the case of a 5' tall person standing on the ground and throwing a rope over a tree branch 25' high. The rope must be at least 40' long to allow both ends to be within reach after it is thrown over the branch. The person must know how to coil the rope properly so it will not tangle when thrown. The person must possess sufficient strength and skill to throw the rope accurately so that it passes over the targeted location on the selected branch. Because other tree branches often snag the rope on its way up or down, the person must have enough time and patience to repeatedly retrieve, recoil and rethrow the rope until it is successfully draped over the branch. After a running closed loop is formed and tightened around the tree branch, the rope is 15'–20' too long and the excess must be removed. Furthermore, this method is impractical for use with chain and steel cable, both of which are too heavy and dangerous to throw overhead.

Another example illustrates a variation of the throwing method for a tree branch 25' high. A small loop is formed on one end of a 25' support cable made from any appropriate material. Then, one end of a 50' length of sturdy cord is attached to a weight. The weight is thrown over the branch, carrying one end of the cord over the branch and back to the ground. The weight is detached and one end of the cord is attached to the free end of the support cable. The other end of the cord is threaded through the looped end of the support cable, forming a very large running closed loop around the tree branch. The cord is pulled, hoisting the support cable over the branch and eventually tightening the running closed loop around the tree branch. Then the cord is untied from the free end of the support cable. This variation is not limited to use with ropes, but may also be used with support cables made from chain or steel cable. However, the installer must keep the cord free of tangles as it is thrown, must have enough strength and skill to throw the weight accurately, and generally must repeat the process many times before the cord is draped snag-free over the branch. Furthermore, the falling weight is hazardous to the installer or anyone else standing below.

As shown in both examples, the throwing method and variations thereof are too difficult to be practical for the routine and repeated use required for a portable tree swing system. Furthermore, these methods do not provide for removing the support cable, making them appropriate only for permanently installed tree swings. My portable tree swing system obviates all such throwing methods for installing support cables on out-of-reach tree branches.

Climbing Methods

A tall extension ladder or step ladder is commonly used for reaching a high tree branch to install a support cable. The difficulties and risks associated with ladders are significant. For example, an extension ladder tall enough to reach a 25' branch is at least 15' long and may weigh in excess of 50 lbs. Such a ladder is so unwieldy to set up that a person with insufficient stature, strength, or skill can easily lose control of the ladder during the set-up process, allowing it to fall and cause damage or injury. In addition, because such ladders are typically made from aluminum which is an electrical conductor, contact with overhead electrical wires may cause electrocution. Finally, a ladder may not be supported with sufficient stability to provide adequate safety. These difficulties and risks may be justifiable for a one-time installation of a permanent tree swing. However, it is unacceptable to incur these difficulties and risks every time a portable tree swing is used. In addition, the cost of a ladder can easily exceed the cost of my entire portable tree swing system. My invention eliminates the use of a ladder while attaching support cables to very high tree branches.

Another way to reach a very high tree branch is to climb the tree. The difficulties and risks associated with tree climbing exceed those of using a ladder. While there are exceptions, safely climbing 25' up into a tree typically requires extraordinary skill, great physical strength, and specialized equipment. The inherent risk of falling is very high. If overhead electrical wires are near, there is also a risk of electrocution. If it is hard to justify incurring these difficulties and risks even for a one-time installation of a permanent tree swing, it is unconscionable for the repeated installation and removal of a portable tree swing. My portable tree swing system eliminates the need to ever climb a tree while attaching support cables to very high tree branches.

Pole-mounted Devices

As alternatives to throwing methods, ladders, and tree climbing, inventors have created a variety of devices for remotely attaching a rope to a tree branch. U.S. Pat. Nos. 5,116,260, 4,635,986, 4,557,214, 4,261,280, 3,945,335, and 3,918,385 show a variety of boat-mooring devices for remotely passing a running closed loop over an open-ended mooring such as a piling or cleat. However, tree branches generally do not present an open end for passing a loop over, unless the branch has been broken or cut off at a convenient point. Therefore, these devices could not be used for remotely installing a running closed loop around a tree branch. With my portable tree swing system, a running closed loop can be remotely installed around any overhead tree branch or other similar support, whether or not such support is open-ended.

Inventors have created a variety of mechanical devices for remotely passing a rope or line around objects which are not open-ended. U.S. Pat. No. 5,292,160 to Deichman (1994) and U.S. Pat. No. 3,813,122 to Wemyss (1974) disclose boat mooring devices comprising a two-armed member and a pivoting member. Using a long pole, the two-armed member is first positioned around and then withdrawn from around the object, causing the pivoting member to pass the end of a rope or line from one arm to the other around the back of the object. U.S. Pat. No. 2,700,252 to Paganelli (1955) shows a functionally equivalent device for remotely passing the end of a rope over a tree branch. U.S. Pat. No. 3,774,953 to Babcock (1973) shows another device for placing a rope over a tree branch. This device is composed of a C-shaped element with a rope clamp at the top end and a rope grasping apparatus at the bottom end. The end of a rope is secured in the rope clamp. Using a long pole, the C-shaped element is positioned about a tree branch such that the end of the rope is placed over the branch. The rope grasping apparatus then mechanically catches the end of the rope so that it can be retrieved to form an open loop around the branch. U.S. Pat. No. 3,072,429 to Stipan (1963) discloses an even more complex but functionally similar device for placing a rope over a girder. U.S. Pat. No. 2,591,638 to Trafton (1952) discloses a device for remotely connecting two ends of a line over an overhead tree branch. The device is composed of two pivotally connected jaws, each jaw having positioned thereon a clip carrying one end of a line. Using a long pole, the jaws are positioned and closed around the tree branch, engaging the clips. The jaws are then opened and withdrawn from the branch, leaving the line connected in an open loop over the branch. A very similar device shown in U.S. Pat. No. 5,174,057 to Sienel (1992) is designed for remotely forming a running closed loop around the tail of a large fish, and could be adapted for use with a tree branch. However, neither Sienel nor any other inventor cited herein provides any way to remotely remove the running closed loop as would be required for use with a portable swing.

The mechanical complexity of all these devices is necessary for lateral reaching operations in which the force of gravity must be overcome while passing a line or rope around an object, as in reaching for a boat mooring. However, for overhead reaching as in placing a rope or line over a tree branch wherein the force of gravity can be used to advantage, such devices are unnecessarily complex, heavy, and costly when compared with my portable tree swing system. In addition, my invention provides a solution to the problem of remotely removing a support cable from a very high tree branch.

U.S. Pat. No. 4,895,407 to Mozer (1990) shows a device designed for use by a worker positioned in a tree to remotely form a running closed loop around a tree branch. The worker extends the device laterally along one side of a tree branch and lays the looped end of a rope over the branch. He then uses the device to hook the loop from under the other side of the branch, an operation which requires much skill and finesse. However, this invention is not well suited for use with very high overhead branches because the weight of the rope hanging down from the branch will pull the looped end off the branch before it can be hooked from the other side. In contrast, the use of my portable tree swing system requires no extraordinary skill or finesse when placing a support cable over a very high tree branch, and it is designed to be used by an adult human standing safely on the ground.

Inventors have created another class of devices, known as rope drops, specifically designed for draping a rope over an overhead tree branch. With all such devices, one end of a rope is secured within reach. The rope drop is then used to pass the bulk of the rope over a tree branch and then release it, allowing gravity to pull it to the ground. U.S. Pat. No. 3,856,340 to Faulkner (1974) uses a horizontal channel on the end of a long pole to lift a spool of rope over a tree branch. The spool is released, rolls out of the channel, and falls to the ground. The rope unwinds from the spool as it falls. Note that the falling spool presents an obvious hazard to people on the ground. U.S. Pat. No. 2,688,510 to Heyser (1954) comprising a horizontal arm, one end of which is connected to the tip of a vertical pole. The other end of the arm has a release mechanism from which a coil of rope is suspended. Using the long pole, the horizontal arm is placed over the tree branch and the rope is released. The rope uncoils as it falls to the ground. By providing mechanisms for lifting the bulk of a rope all at once over a branch and then releasing it, both inventions are unnecessarily complex, heavy, and costly when compared with my portable tree swing system.

U.S. Pat. No. 5,415,446 to Olson (1995) discloses an anchor strap with a loop on one end and a relatively rigid portion with an anchor ring at the other end. While designed for attaching an anchor strap to a girder, this invention might be adapted for use with portable tree swings. Installation is a two step process. In the first step, a device fastened to the end of a long pole is used to lay the rigid portion of the anchor strap across the top of a girder so that the ring extends over one side and the loop hangs from the other. The device is then threaded through the loop and, passing under the girder, hooks the ring. The device is then withdrawn from the loop, which action threads the ring and the rigid portion through the loop, forming the anchor strap into a running closed loop around the girder. (The same device is used later to retrieve the strap.) In the second step, another device is fastened to the end of a long pole and is used to connect (and later disconnect) the snap hook of a lifeline to the anchor ring. My portable tree swing system eliminates the need for two devices and two remote installation steps, replacing these with a single simple device and installation operation. Furthermore, my invention allows easy retrieval without the use of a pole-mounted device.

Inventors have created devices for remotely installing electrical wires or maintaining electrical fixtures, which devices might be adapted for passing a rope or line over a tree branch. U.S. Pat. No. 5,054,829 to Olsen (1991) uses a long pole to pass an electrical wire over objects such as ceiling joists or air ducts. The wire is attached to a weight which is in turn fastened to the end of the pole. The pole is used to pass the weight over a joist or air duct and then release it, allowing the gravity to pull the weight and attached electrical cable to the floor. If the wire is too heavy, a wire pulling rope may be passed over the object and then used to hoist the wire over the object. If used for passing a rope or line over a branch, this device would expose the rope or line to small tree branches which would snag and entangle it as the pole is lifted into the tree. Furthermore, a very heavy weight would be required to overcome the friction between the line or rope and very rough tree bark, rendering the weight dangerous if the user lost control of it. My portable tree swing system overcomes both problems. U.S. Pat. No. 5,494,326 to Hinds (1996) shows a telescoping device for detaching and lowering an overhead electrical fixture. While this device could be adapted for hoisting a tree swing support cable over a tree branch, it is unnecessarily complex, heavy, and costly when compared with my portable tree swing system. Moreover, the hoist line of this device is attached along the outside of the telescoping pole, making the hoist line susceptible to becoming snagged or entangled in small tree branches.

OBJECTS AND ADVANTAGES

Accordingly, several objects and advantages of my portable tree swing system are:

(a) to provide a portable tree swing system which may be easily carried by one person, and which allows one or more support cables to be quickly and easily installed on and removed from out-of-reach tree branches by an adult human while standing on the ground;

(b) to provide a portable tree swing system designed to be used and enjoyed by people of all ages;

(c) to provide a portable tree swing system with a secure method for attaching support cables to an out-of-reach tree branch which eliminates the need for permanent anchors to be installed on the branch;

(d) to provide a portable tree swing system with a simple method for fastening one end of a support cable around a tree branch which also eliminates slipping and abrasion between support cables and the branch, and the wear and tear which result;

(e) to provide a portable tree swing system which uses a running closed loop, previously used only for permanently installed tree swings, as the method for attaching support cables to a tree branch;

(f) to provide a portable tree swing system which eliminates the need to throw support cables or other objects over an out-of-reach tree branch;

(g) to provide a portable tree swing system which eliminates the need to use a ladder or to climb the tree while attaching support cables to an out-of-reach tree branch;

(h) to provide a portable tree swing system which includes a method for forming one end of a support cable into a running closed loop around an out-of-reach tree branch or other similar support, whether or not the support is open-ended;

(i) to provide a portable tree swing system which provides mechanically simple solutions for remote installation and removal of support cables from an out-of-reach tree branch or other similar support;

(j) to provide a portable tree swing system which does not require the bulk of a support cable to be lifted all at once over an out-of-reach tree branch.

Further objects and advantages are to provide a portable tree swing system which is easy and inexpensive to manufacture, which can be made available as a commercial product, which allows precise positioning of support cables on out-of-reach tree branches, which assures the safe installation, use, and removal of a portable tree swing, which is impervious to weather and can therefore be installed permanently if desired, and which, if installed permanently, can be easily removed for periodic inspection and maintenance and then easily reinstalled. Still further objects and advantages will become apparent from a consideration of the ensuing description and drawings.

DRAWING FIGURES

In the drawings, closely related figures have the same numeral, but have different alphabetic suffixes.

FIG. 2A shows an overall view of the hoist line placing device 20.

FIG. 2B shows an overall view of the support cable assembly 50.

FIGS. 7A–14B show the process in the preferred embodiment for using the hoist line placing device 20 to install the support cable assembly 50 on a tree branch B approximately 25' above the ground.

Figure 15A:
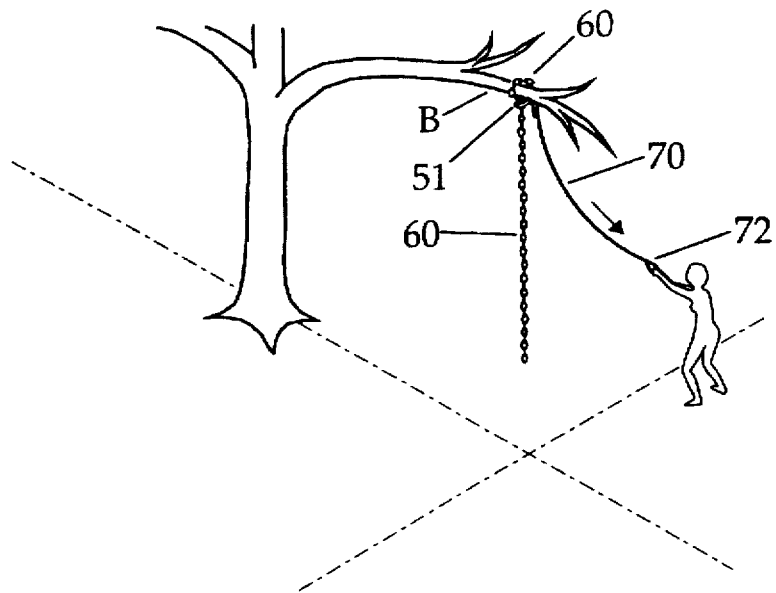
Figure 15B:
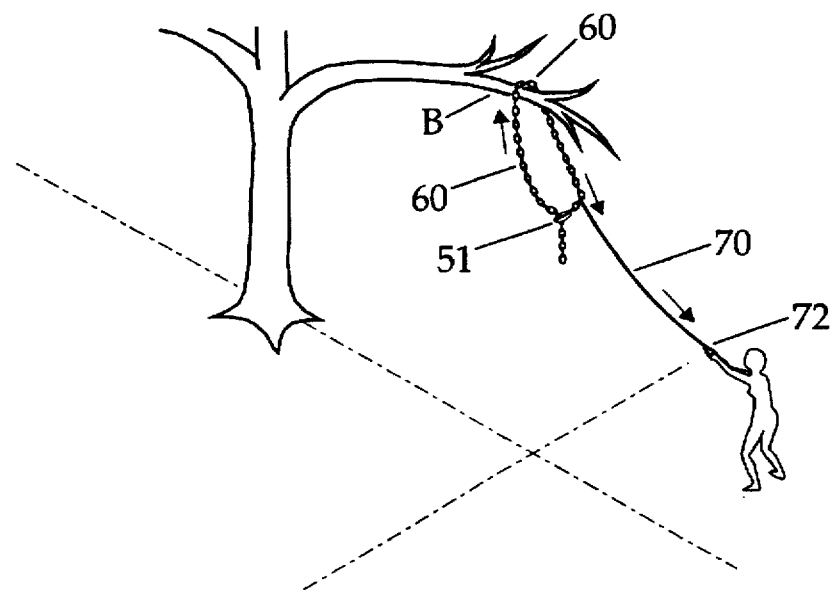

FIG. 15A–15B show the process in the preferred embodiment for removing the support cable assembly 50 from a tree branch B

REFERENCE NUMERALS IN DRAWINGS 20 hoist line placing device
21 tubular pole
21A tubular section
21A' locking detent
21B tubular section
21B-S stop tab
21B' locking detent
21C tubular section
21C' locking detent
21D tubular section
21D' tubular pole tip
22A modified compression coupling
22A-1 modified compression coupling body
22A-2 rubber gasket
22A-3 compression ring
23A sleeve coupling
30 hoist line
31 line storage device or spool
40 closeable fastener
40A line feeding device
50 support cable assembly
51 running loop collar
52 hinge
60 support cable
60A ⁵⁄₁₆" zinc-plated steel proof-coil chain
60B ¼"×1¼" steel lap link
60C ³⁄₁₆" zinc-plated steel proof-coil chain
61 ³⁄₁₆"×1⅞" inside diameter zinc-plated steel quick link
70 retrieval cable
70A ³⁄₃₂" zinc-coated steel aircraft cable 71 retrieval cable connector
71A ¼" polyethylene tubing
71B 3/32" cable clamp
72 retrieval cable handle
B tree branch
S swing, swing-like amusement device, or article of hanging furniture

SUMMARY OF THE INVENTION

My portable tree swing system comprising a hoist line placing device 20 and a support cable assembly 50, along with the methods described below, is designed and intended to be used for the installation and retrieval of a portable tree-swing. With this system, any conventional swing, swing-like amusement device, or article of hanging furniture is quickly and easily installed on and removed from an out-of-reach overhead object, such as a tree branch, by an adult human standing on the ground. A portable tree-swing can be taken to the park, camping, or on vacation and installed on any tree with an appropriate branch. The heavy-duty support cable assembly can accommodate people of adult weight.

Description—Main Embodiment (FIGS. 2–6)

A preferred, least cost embodiment of my portable tree swing system is illustrated in FIGS. 2A and 2B. My portable tree swing system is generally comprised of a hoist line placing device 20 (FIG. 2A) and a support cable assembly 50 (FIG. 2B). As will be shown hereafter, all components of the preferred embodiments of hoist line placing device 20 and support cable assembly 50 are readily available as, or can be fashioned from, conventional plumbing or hardware components commonly supplied by plumbing and hardware retailers and wholesalers.

FIG. 2A shows an overall view of hoist line placing device 20. The hoist line placing device comprises a rigid, elongated, telescopic, tubular pole 21 with a hoist line 30 partially unwound from a line storage device or spool 31 which is wound with a supply of hoist line 30. Hoist line 30 is coaxially threaded through tubular pole 21 from bottom to top, and attached to a closable fastener 40. Tubular pole 21 has an inside diameter large enough to allow hoist line 30 to feed freely and continuously through it, and is threaded by attaching the free end of hoist line 30 to a long dowel or wire which is then passed through tubular pole 21.

FIG. 2B shows an overall view of support cable assembly 50. The support cable assembly is comprised of a running loop collar 51 connected to the top end of a support cable 60. A retrieval cable 70 is connected with a retrieval cable connector 71 to support cable 60 at a position approximately 3" below running loop collar 51. A retrieval cable handle 72 is connected to or formed at the bottom of retrieval cable 70.

Figure 1A:
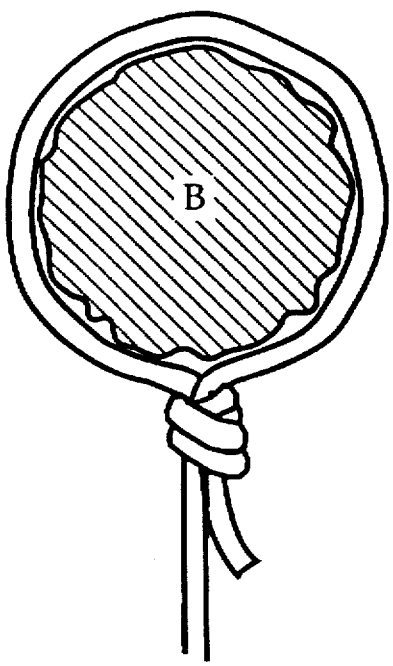
FIG. 1A–1C show a general comparison of a closed loop, open loop, and running closed loop.
Figure 1B:
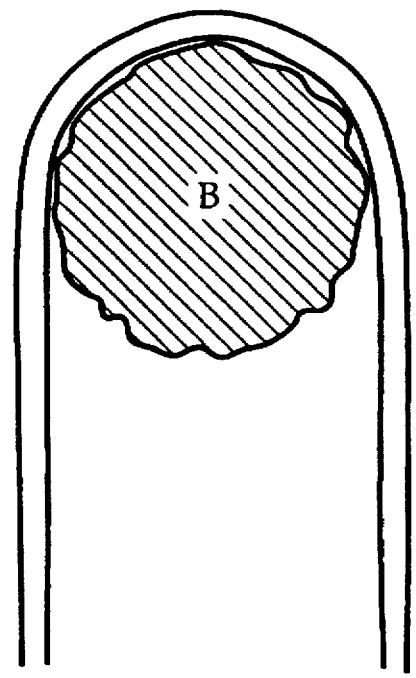
Figure 1C:
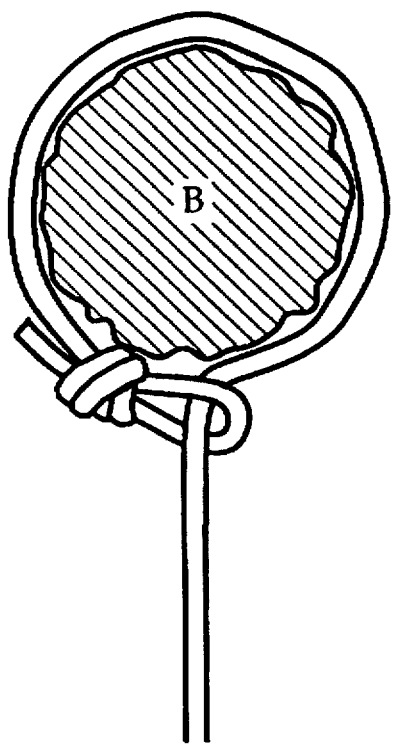
Figure 3:
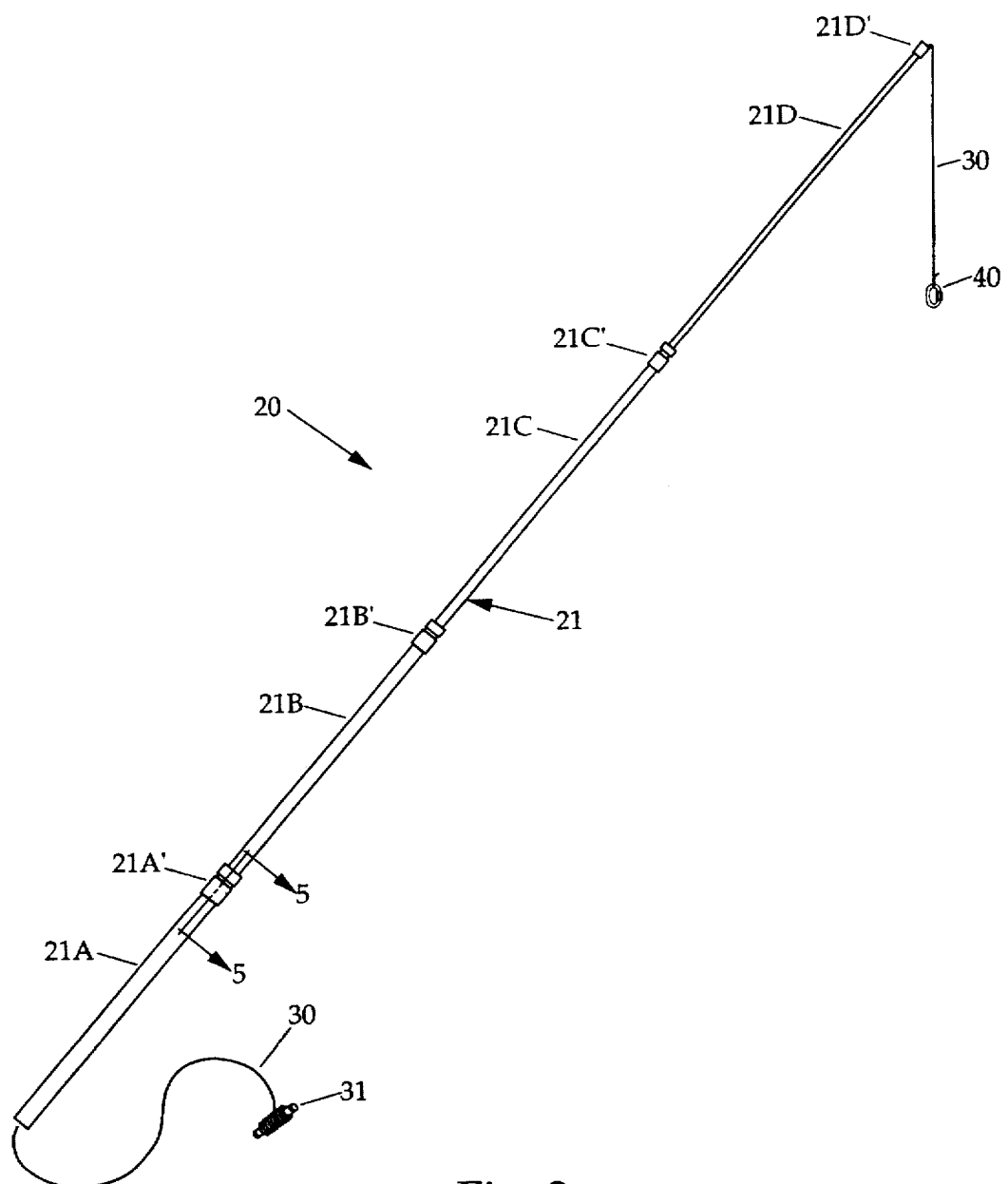
FIG. 3 shows a side view of the preferred embodiment of hoist line placing device 20 extended to its full length.

FIG. 3 shows a side view of the preferred embodiment of hoist line placing device 20. Tubular pole 21 is shown extended to its full length. Tubular pole 21 is comprised of four extendable telescoping tubular sections 21A, 21B, 21C, and 21D manufactured from Schedule 200 polyvinylchloride (PVC) pipe of predetermined nesting diameters. The tubular sections are connected with three locking detents 21A', 21B', and 21C', each of appropriate inside diameter to allow insertion of the tubular sections 21B, 21C, and 21D respectively. A tubular pole tip 21D' is comprised of a schedule 40 PVC sleeve coupling with an inside diameter equal to the outside diameter of tubular section 21D. The fully extended length of tubular pole 21 is a function of the highest point on a tree branch where support cable assembly 50 is intended to be installed. Fully extended, tubular pole 21 should be of sufficient length so that an adult human standing on the ground can place tubular pole tip 21D' over a tree branch at the desired point of installation. For example, if the top of the tree branch is 25 feet above the ground and the person doing the installation is of average adult height, tubular pole 21 should extend to a length of at least 20 ft.

Other components of the preferred embodiment of hoist line placing device 20 are also shown in FIG. 3. Closable fastener 40 is comprised of a standard steel quick link, safety spring link, or carabiner with a load carrying capacity of at least 50 lbs. Closable fastener 40 must be large enough to prevent it from being pulled into tubular pole tip 21D. Hoist line 30 is made from approximately 100 ft. of durable, abrasion resistant, braided nylon cord, such as parachute cord, with a load carrying capacity of at least 50 lbs. Spool 31 is made from a length of approximately ½" to 1" diameter PVC pipe about 6" to 8" long which is capped with a standard PVC end cap on each end.

Figure 4A:
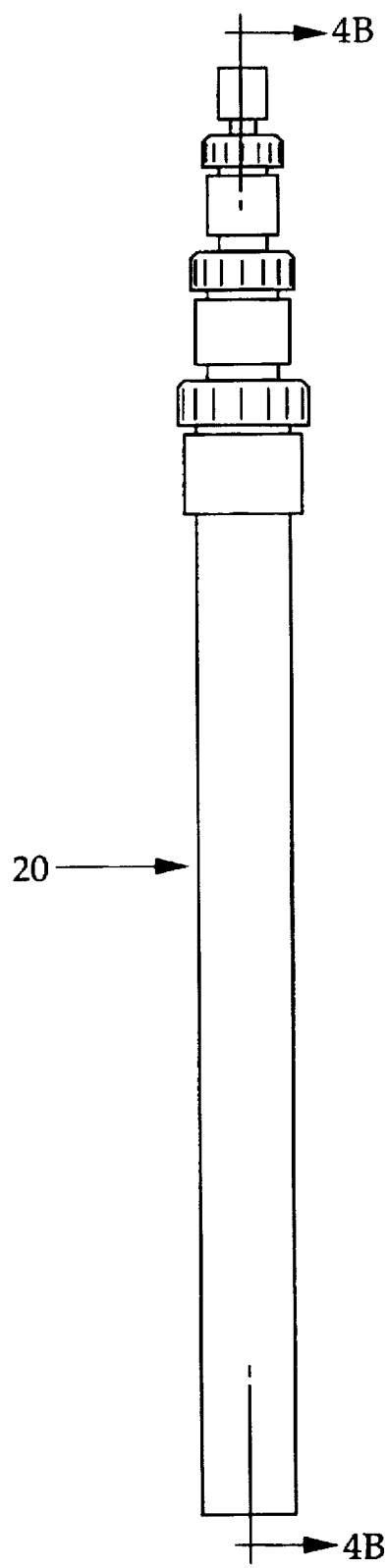
FIG. 4A shows a side view of the preferred embodiment of the tubular pole 21 retracted to its shortest length.
Figure 4B:
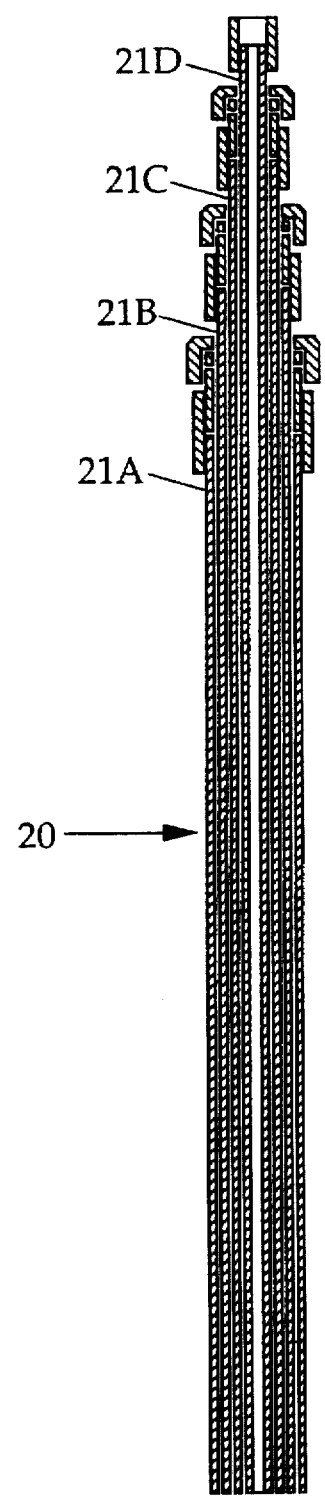
FIG. 4B shows a longitudinal cross section through the preferred embodiment of tubular pole 21 retracted to its shortest length.

FIG. 4A shows a side view of the preferred embodiment of tubular pole 21 retracted to its shortest length. FIG. 4B shows a longitudinal cross section through the preferred embodiment of tubular pole 21 retracted to its shortest length. As shown in FIG. 4B, the lengths of tubular sections 21A, 21B, 21C, and 21D vary such that their bottom ends are co-planar when tubular pole 21 is retracted to its shortest length.

Figure 5:
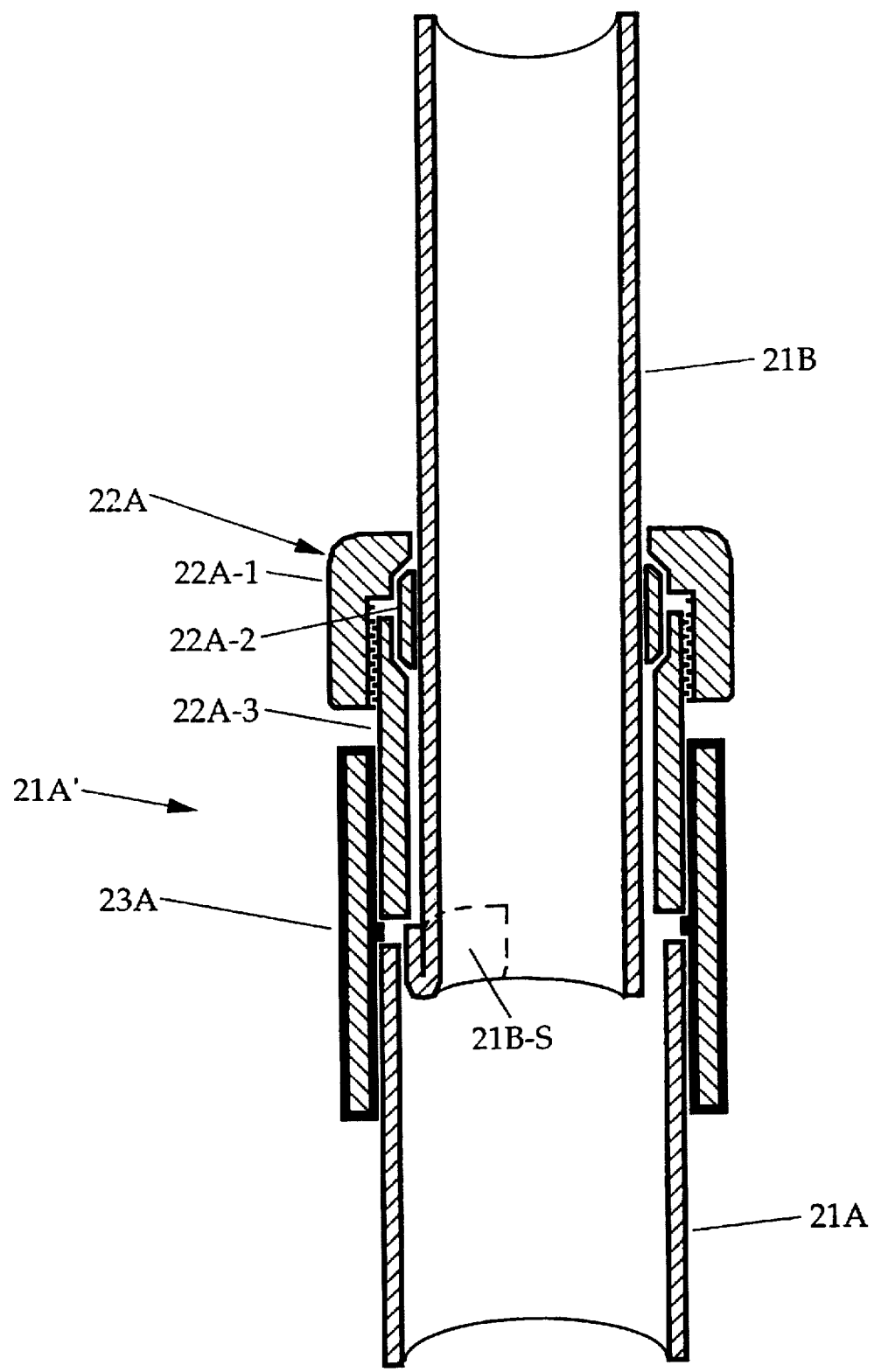
FIG. 5 shows a longitudinal cross section through the preferred embodiment of the tubular pole 21 at the joint between tubular sections 21A and 21B.

FIG. 5 shows a longitudinal cross section through the preferred embodiment of tubular pole 21 at the joint between tubular sections 21A and 21B where section 21B is fully extended from section 21A. A square or rectangular tab about ¾"×¾" which extends from the bottom edge of tubular section 21B is folded back until it rests against the outside surface of tubular section 21B, forming a stop tab 21B-S. Stop tab 21B-S prevents the complete withdrawal of tubular section 21B from locking detent 21A'. It will be readily understood that the construction and function of stop tab 21B-S as described above is typical of other stop tabs on the bottom edges of tubular sections 21C and 21D, except for appropriate variations in dimensions.

As shown in FIG. 5, locking detent 21A' is comprised of two primary elements. One element is a modified compression coupling 22A which is modified from a conventional schedule 40 PVC compression coupling such as Flo-Control IPS couplings manufactured by FLO of Burbank, Calif. The other element is a conventional schedule 40 PVC sleeve coupling 23A. Both are standard plumbing components readily available from numerous retail and wholesale plumbing materials suppliers. Modified compression coupling 22A is manufactured from a conventional compression coupling with an inside diameter equal to the outside diameter of tubular section 21B. The standard compression coupling is bisected along its transverse axis of symmetry and one half is discarded. Therefore, modified compression coupling 22A comprises one half of the conventional compression coupling and includes a compression ring 22A-1, a rubber gasket 22A-2, and a modified compression coupling body 22A-3. The inside diameter of rubber gasket 22A-2, enlarged as necessary through a reaming operation, allows the full length of tubular section 21B to easily slide through it when the compression ring 22A-1 is loosened. The outside diameter of body 22A-3, reduced as necessary through a lathing or grinding operation, fits tightly inside sleeve coupling 23A. Body 22A-3 and sleeve coupling 23A are cemented together using standard PVC joining materials and techniques. The inside diameter of sleeve coupling 23A is equal to the outside diameter of tubular section 21A. Sleeve coupling 23A and tubular section 21A are also cemented together. It will be readily understood that the construction of locking detent 21A' as described above is typical of the construction of the other locking detents 21B' and 21C', except for appropriate variations in inside and outside diameters of their various components.

Figure 6:
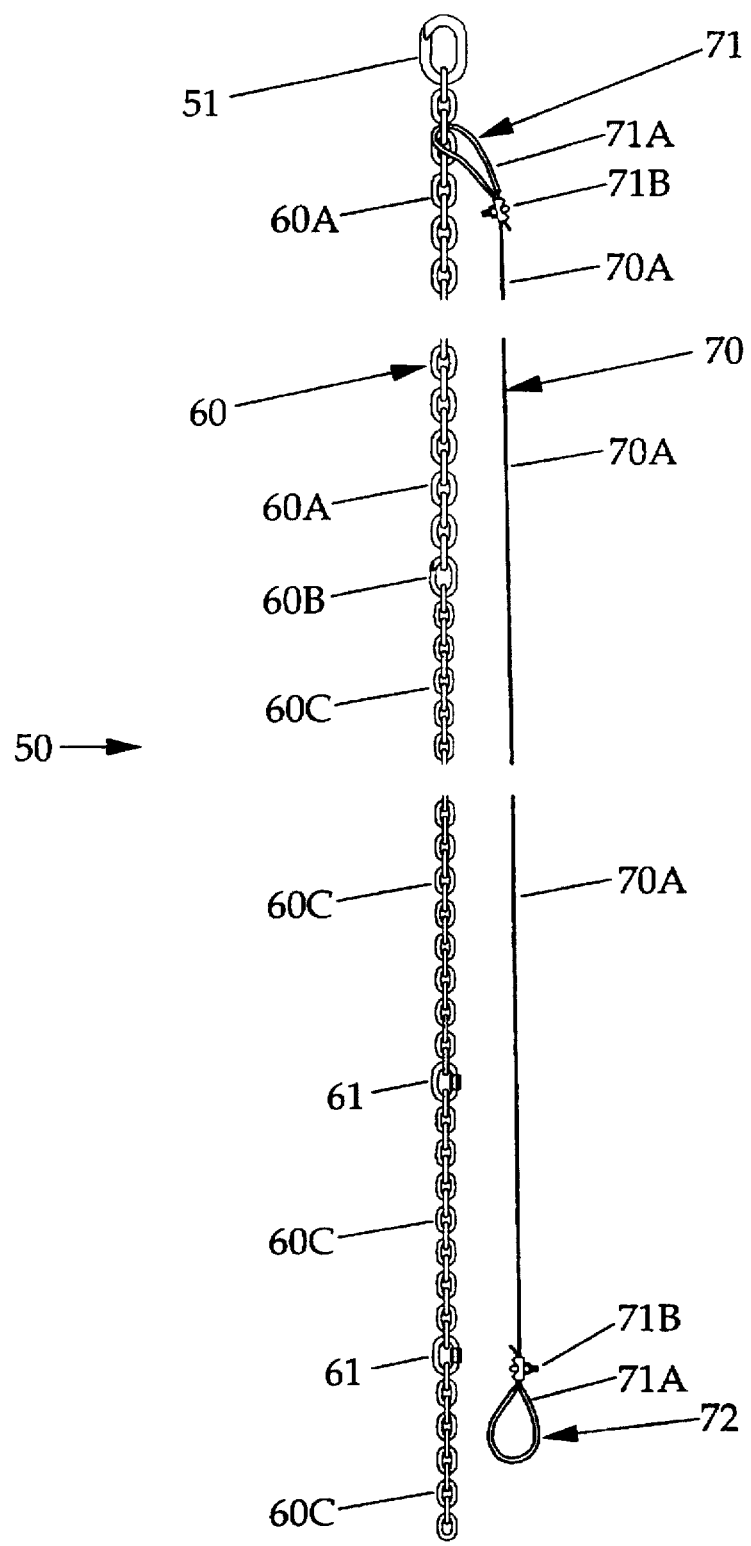
FIG. 6 shows the preferred embodiment of the support cable assembly 50.

FIG. 6 shows the preferred embodiment of support cable assembly 50. The primary elements of support cable assembly 50 include running loop collar 51, support cable 60, retrieval cable 70, retrieval cable connector 71, and retrieval cable handle 72.

Running loop collar 51 is comprised of a ⅛"×2" inside diameter galvanized steel lap link. Support cable 60 is comprised of three elements including, from top to bottom, a ⁵⁄₁₆" zinc-plated steel proof-coil chain 60A, a ¼"×1¼" zinc-plated steel lap link 60B, and a ³⁄₁₆" zinc-plated steel proof-coil chain 60C. The purpose for the three elements of support cable 60 will be discussed later.

Running loop collar 51 is connected to the top end link of the ⁵⁄₁₆" chain 60A. The bottom end link of the ⁵⁄₁₆" chain 60A is connected to the top end link of the ³⁄₁₆" chain 60C with the lap link 60B. The ³⁄₁₆" chain 60C is subdivided into several sections which are connected together with ³⁄₁₆"× 1⅞" inside diameter zinc-plated steel quick links 61. This allows the length of the ³⁄₁₆" chain 60C to be adjusted as necessary by removing or adding sections. Such adjustments are required in a portable tree swing system to accommodate tree branches of various heights.

Retrieval cable 70 is comprised of ³⁄₃₂" zinc-coated steel aircraft cable 70A. Retrieval cable connector 71 is a closed loop which is secured through a link near the top of the ⁵⁄₁₆" chain 60A. The closed loop of retrieval cable connector 71 is formed by sheathing the upper end of the ³⁄₃₂" cable 70A with a 1 ft. length of a ¼" polyethylene tubing 71A so that the end of the ³⁄₃₂" cable 70A protrudes approximately 2" from one end of the ¼" polyethylene tubing 71A. The ¼" polyethylene tubing 71A is folded back on itself to form a closed loop and the ³⁄₃₂" cable 70A is clamped to itself with a ³⁄₃₂" cable clamp 71B at the points where the ³⁄₃₂" cable 70A emerges from both ends of the ¼" polyethylene tubing 71A. Retrieval cable handle 72 is constructed identically to the closed loop of the retrieval cable connector 71 except that retrieval cable handle 72 is not connected to the support cable 60, allowing the retrieval cable handle to hang freely. All components of the preferred embodiment of support cable assembly 50 are readily available from retail and wholesale hardware suppliers.

The length of the ⁵⁄₁₆" chain 60A is a function of the largest diameter tree branch on which support cable 60 is intended to be installed. The ⁵⁄₁₆" chain 60A should be of sufficient length to wrap completely around the tree branch with approximately 1 ft. of chain to spare. For example, a chain approximately 4 ft. long is sufficient for tree branches up to 1 ft. in diameter. The length of the ³⁄₁₆" chain 60C is a function of the highest point on a tree branch where support cable 60 is intended to be installed. The ³⁄₁₆" chain 60C should be of sufficient length so that the bottom of support cable 60 is within the reach of an adult human of average height who is standing on the ground. For example, if the support cable 60 is installed on a 1 ft. diameter tree branch the top of which is 25 feet above the ground, the ³⁄₁₆" chain 60C must be at least 17 ft. long to hang within 6 ft. of the ground. Similarly, the length of retrieval cable 70 is a function of the highest point on a tree branch where support cable 60 is intended to be installed. Retrieval cable 70 should be of sufficient length so that the bottom of retrieval cable handle 72 is within the reach of an adult human standing on the ground. For example, if retrieval cable 70 is attached to a support cable 60 which is installed on a 1 ft. diameter tree branch the top of which is 25 feet above the ground, retrieval cable 70 must be at least 18 ft. long to hang within 6 ft. of the ground.

Operation—Main Embodiment (FIGS. 7–15)

The manner of using my portable tree swing system includes a nine step process described below and illustrated in FIGS. 7–15.

Step 1.

Figure 7A:
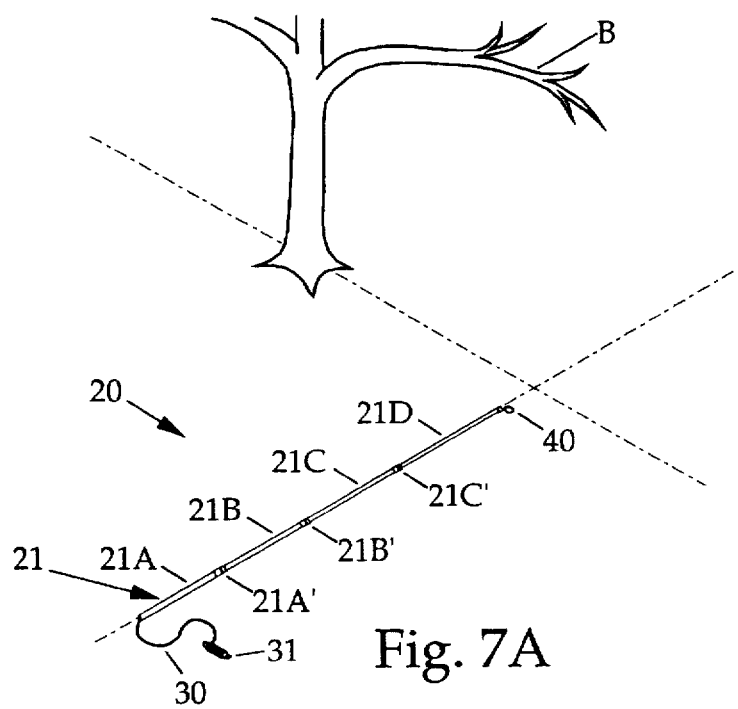
Figure 7B:
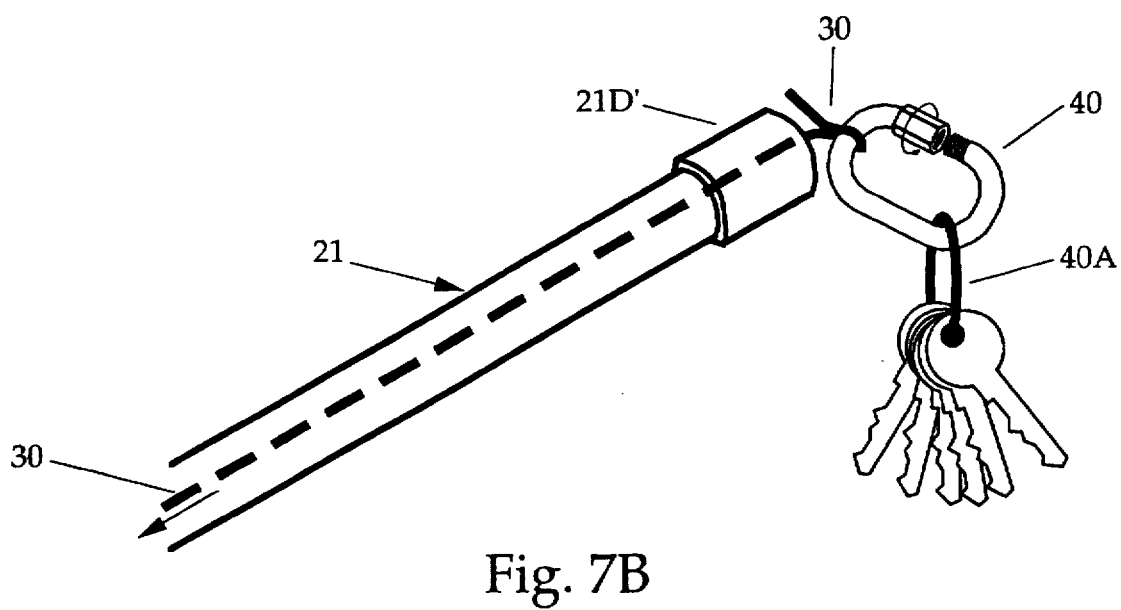

The telescoping construction of tubular pole 21 allows hoist line placing device 20 to be retracted to its shortest length for convenient storage and transport. When hoist line placing device 20 is being prepared for use, tubular pole 21 is extended to its full length, as shown in FIG. 7A. This is done by loosening locking detents 21A', 21B', and 21C' and extending tubular sections 21B, 21C, and 21D to their full lengths. As tubular pole 21 begins to extend, tension on hoist line 30 causes the line to unwind from spool 31 as needed. As tubular pole 21 continues to extend, tension on hoist line 30 pulls closeable fastener 40 tight against tubular pole tip 21D'. Locking detents 21A', 21B', and 21C' must then be tightened to prevent tubular sections 21B, 21C, and 21D from retracting during use. Once tubular pole 21 is fully extended, a line feeding device 40A comprising any convenient weight of about 4 ounces, such as a key ring, is connected to closeable fastener 40 as shown in FIG. 7B.

Step 2.

Figure 8B:
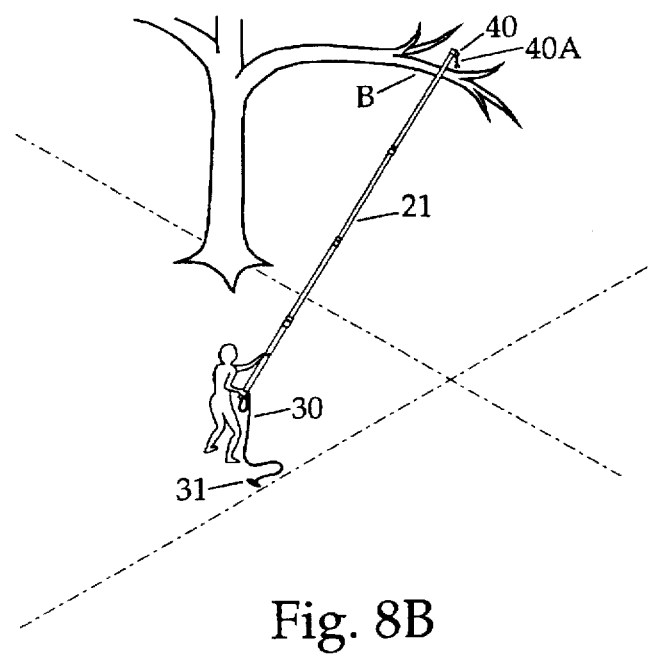
Figure 8A:
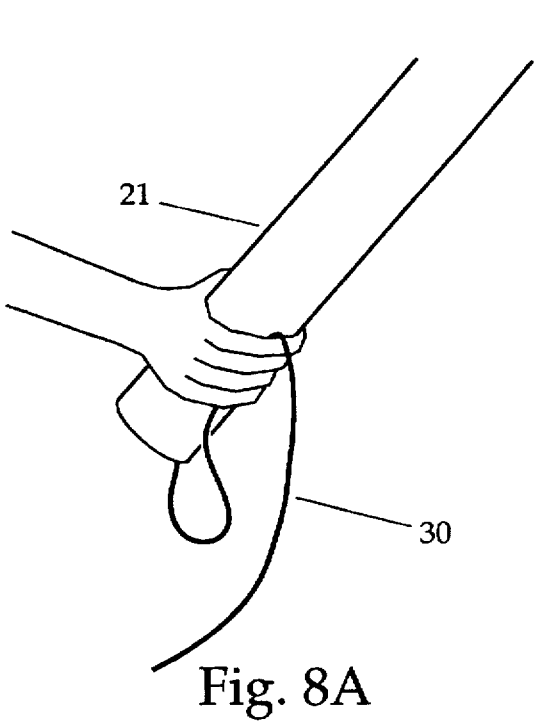
Figure 8C:
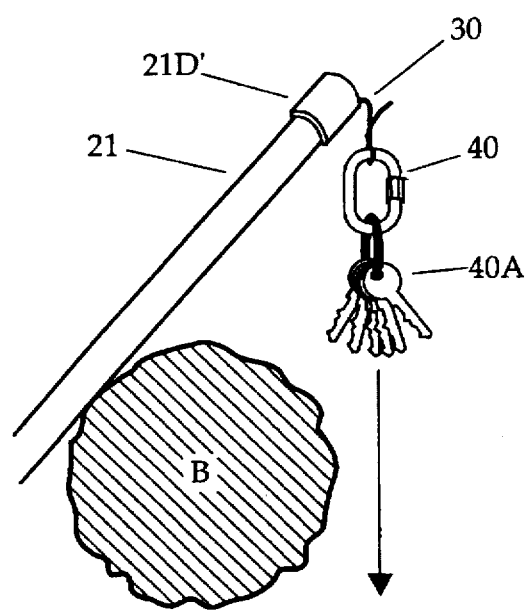

Any remaining slack in hoist line 30 is pulled from the base of tubular pole 21. Hoist line 30 is then grasped securely against the outside surface of tubular pole 21 as shown in FIG. 8A. The top end of tubular pole 21 is then placed on the tree branch B at the point from which the portable tree swing is intended to hang, as shown in FIG. 8B. Tubular pole tip 21D' must reach completely over tree branch B so that closeable fastener 40 and the line feeding device 40A have a clear vertical path to the ground as shown in FIG. 8C. An important and unique advantage accrues in my portable tree swing system by threading hoist line 30 through tubular pole 21. This shields hoist line 30 from becoming snagged or entangled in small tree branches as the length of tubular pole 21 passes through such branches while it is being placed on tree branch B.

Step 3.

Figure 9A:
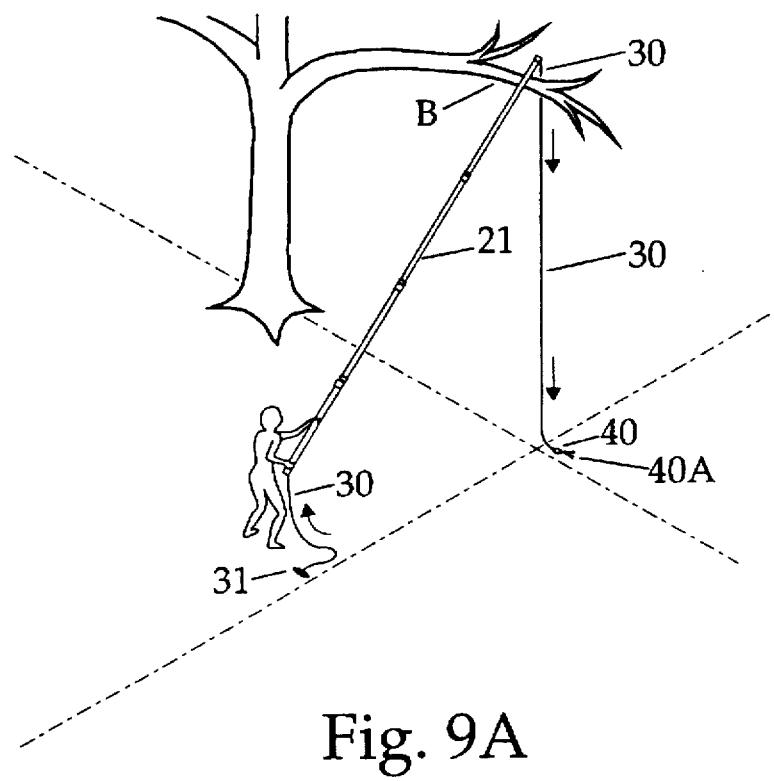
Figure 9B:
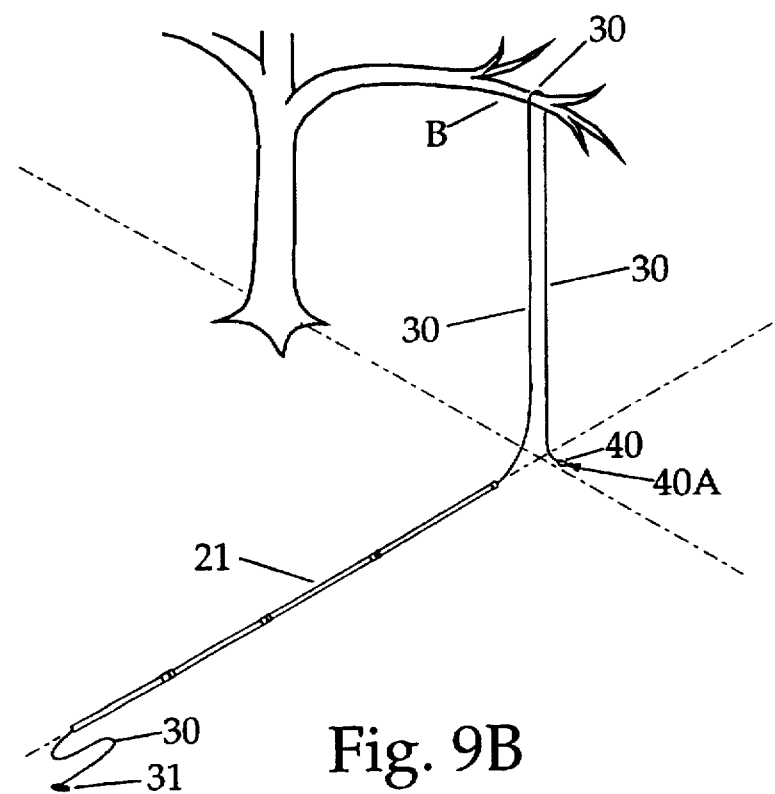

Once the top end of tubular pole 21 is in position on tree branch B, the grasp on hoist line 30 is relaxed and the force of gravity pulls line feeding device 40A gently to the ground as shown in FIG. 9A. As line feeding device 40A descends, it pulls hoist line 30 from the top end of tubular pole 21 which causes hoist line 30 to unwind from spool 31 and feed into the bottom end of tubular pole 21 as necessary. The descent of line feeding device 40A can be easily controlled by gently grasping hoist line 30 as it feeds into the bottom end of tubular pole 21. An important and unique advantage accrues in my portable tree swing system by having the hoist line 30 feed from tubular pole tip 21D' directly to the ground, without coming in contact with tree branch B, as was previously shown in FIG. 8C. Such contact would create friction between hoist line 30 and tree branch B, requiring line feeding device 40A to be much heavier and resulting in a hazard to people on the ground. Once line feeding device 40A is on the ground, the full length of tubular pole 21 is lowered the ground as shown in FIG. 9B. This causes hoist line 30 to unwind from spool 31 and feed into the bottom of tubular pole 21 as necessary.

Step 4.

Figure 10A:
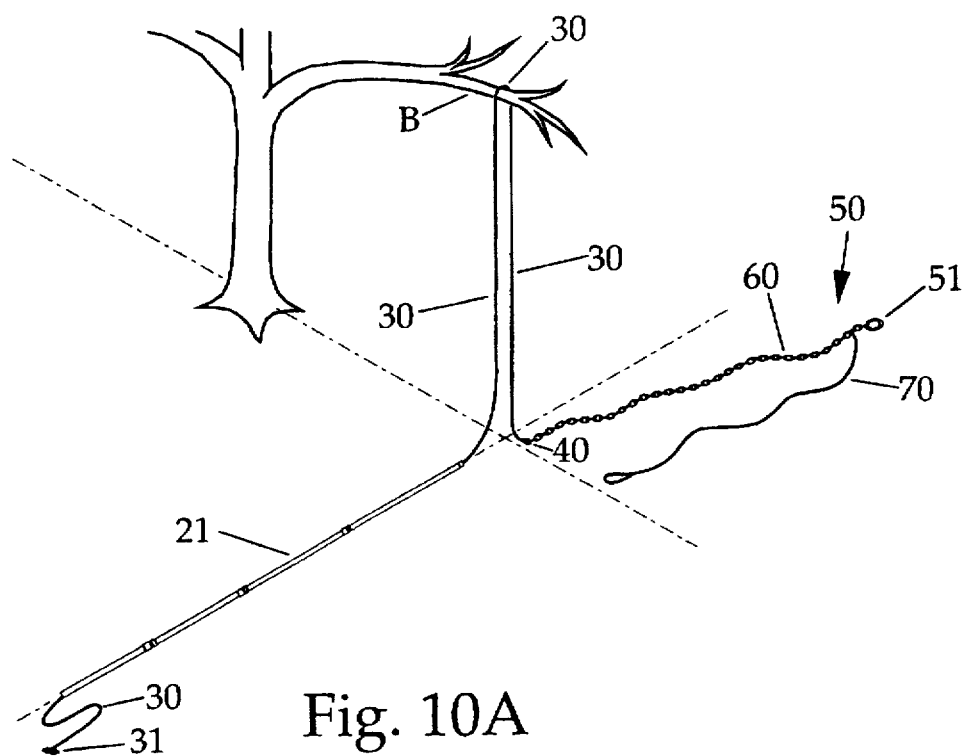
Figure 10B:
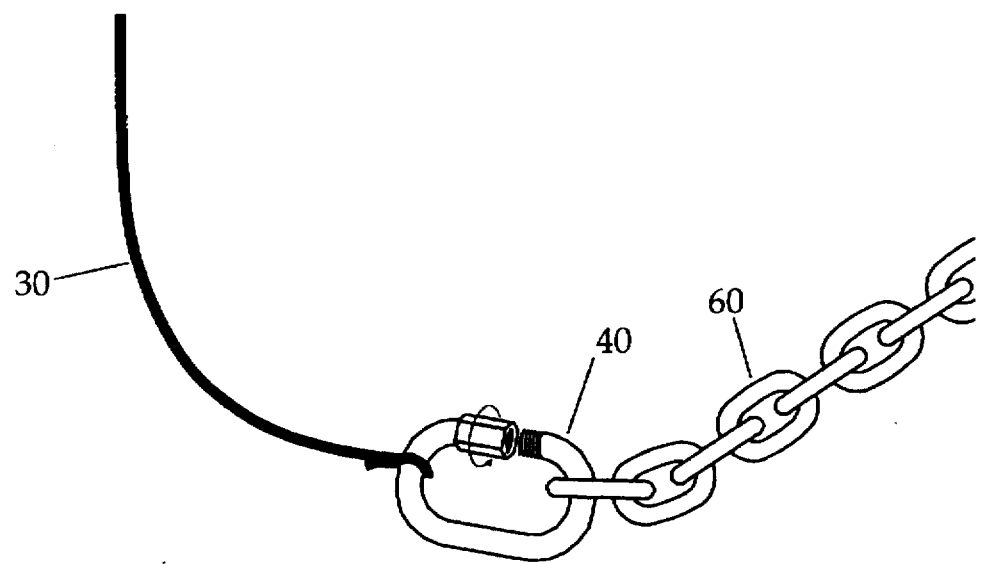

With line feeding device 40A resting on the ground and hoist line 30 draped completely over branch B, line feeding device 40A is disconnected from closeable fastener 40. Support cable assembly 50 is now placed on the ground as shown in FIG. 10A. The bottom end of support cable 60 is connected to closeable fastener 40 as shown in FIG. 10B.

Step 5.

Figure 11A:
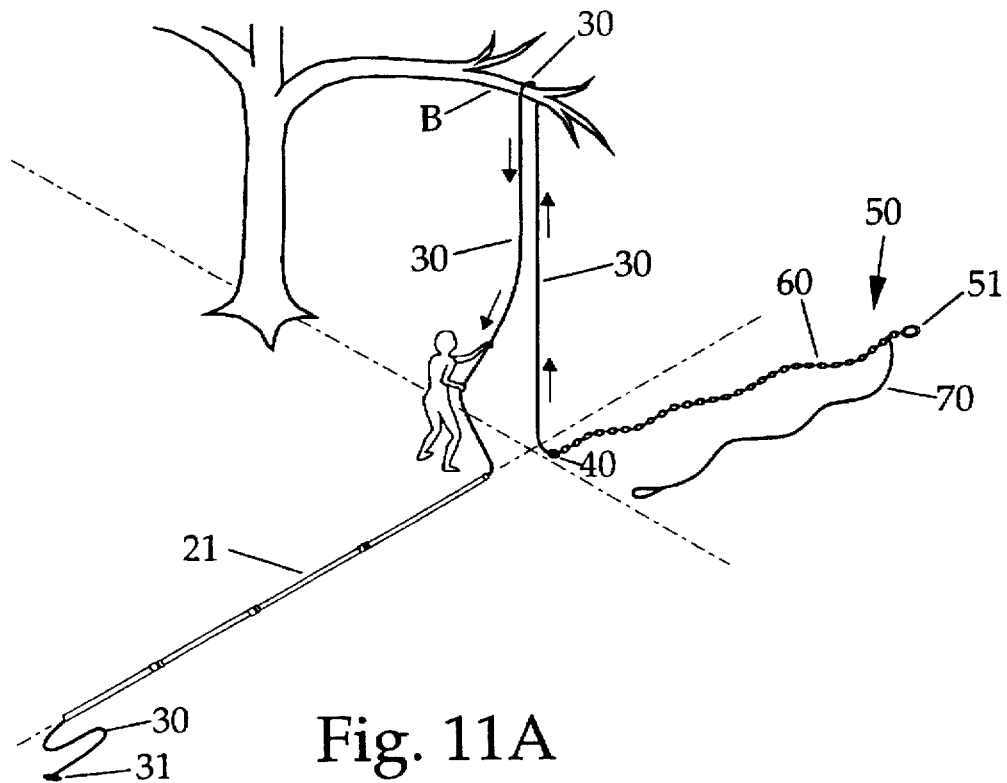
Figure 11B:
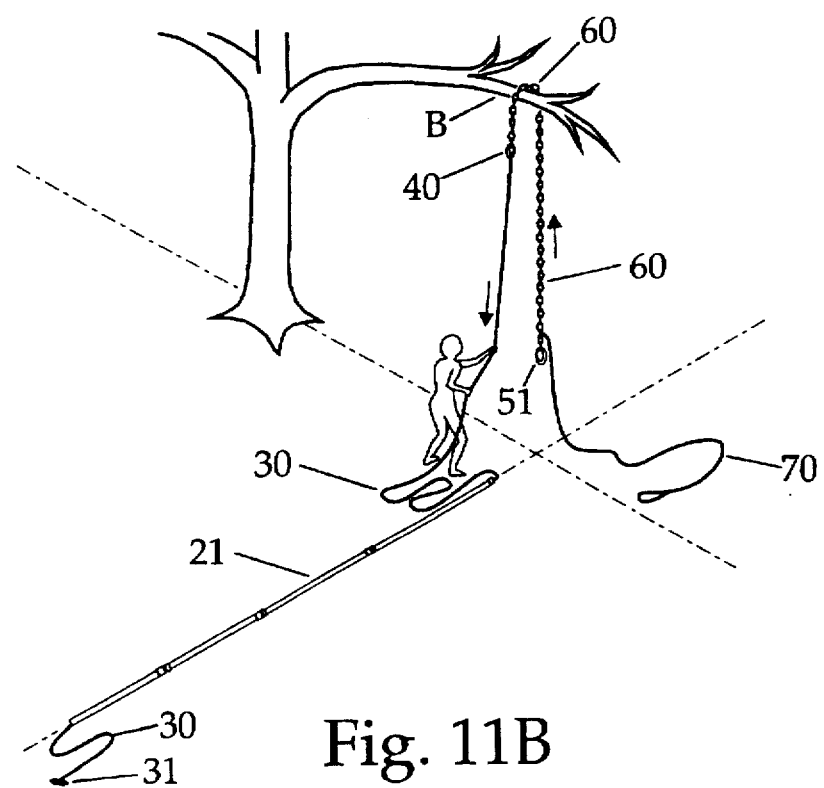

Hoist line 30 is grasped just above where it emerges from the top end of tubular pole 21 as shown in FIG. 11A. Hoist line 30 is then pulled downward to hoist support cable 60 upward and over branch B until running loop collar 51 is hanging above the ground at about eye level, as shown in FIG. 11B.

Step 6.

Figure 12A:
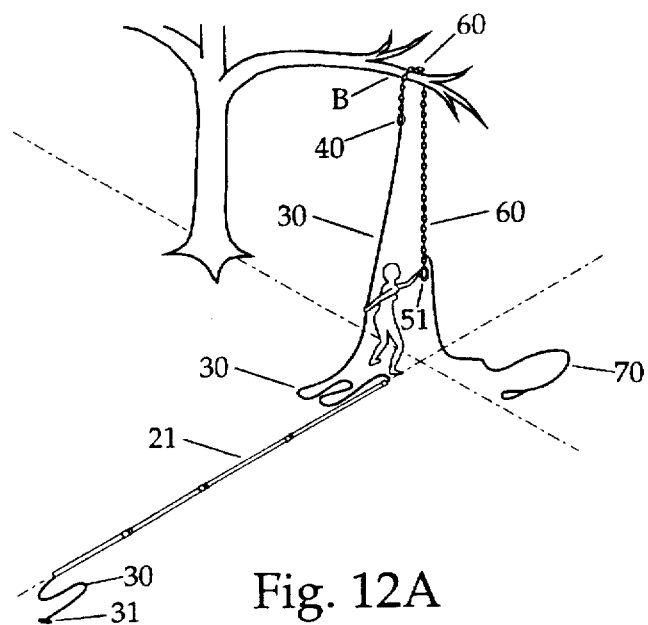
Figure 12B:
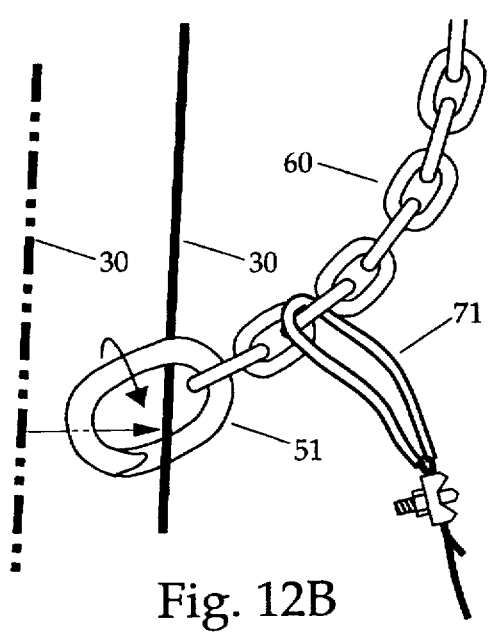
Figure 12C:
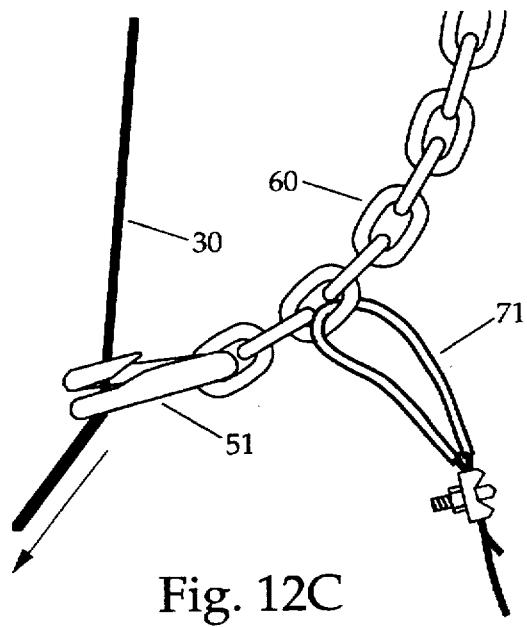

While holding and maintaining tension on hoist line 30 with one hand, running loop collar 51 is grasped with the other hand as shown in FIG. 12A. As described previously, a ⅛"×2" inside diameter galvanized steel lap link serves as running loop collar 51 in the preferred embodiment. Hoist line 30 is inserted into running loop collar 51 by passing the hoist line through the opening or slot in the annulus of the steel lap link as shown in FIG. 12B. Running loop collar 51 is then rotated into its resting position with hoist line 30 threaded through it as shown in FIG. 12C. With hoist line 30 now threaded through running loop collar 51, a loose running closed loop has been formed around tree branch B.

As mentioned previously, the running closed loop method for fastening a support cable to a tree branch offers several significant advantages. A running closed loop is simple to form and is completely secure, but is also easily removed and does not damage the tree branch. A running closed loop is also self-tightening, thus preventing slipping and abrasion between support cable 60 and tree branch B. My portable tree swing system is the first to incorporate the running closed loop method into a portable tree swing system. Furthermore, an important and unique advantage accrues in my portable tree swing system through the use of a ⅛"×2" inside diameter galvanized steel lap link as the running loop collar in the preferred embodiment. As described above, a running closed loop can be easily and conveniently formed around tree branch B without feeding the end of hoist line 30 through running loop collar 51. Otherwise, hoist line 30 would first have to be back-threaded from tubular pole 21 by completely unwinding it from spool 31 and withdrawing it from tubular pole 21 so that the end of hoist line 30 could be threaded through running loop collar 51. This would needlessly increase the time and complexity involved in the operation of the portable tree swing system.

Step 7.

Figure 13A:
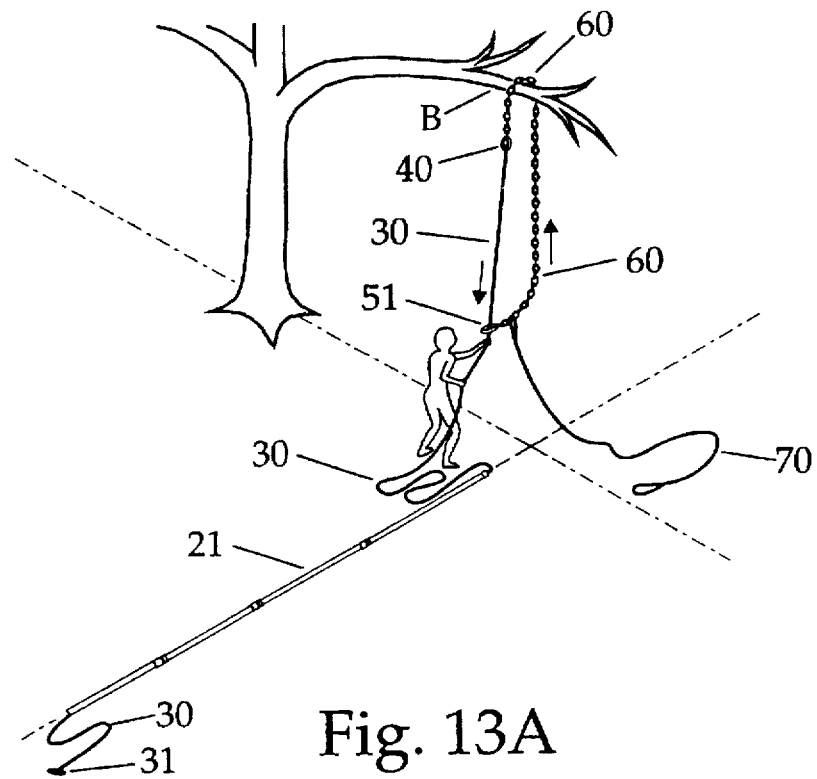
Figure 13B:
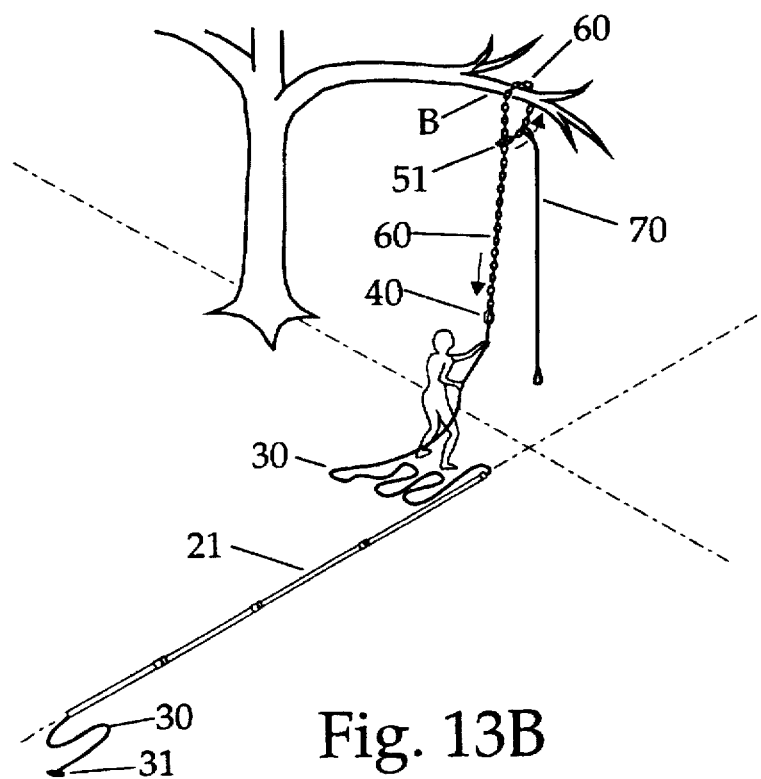
Figure 13C:
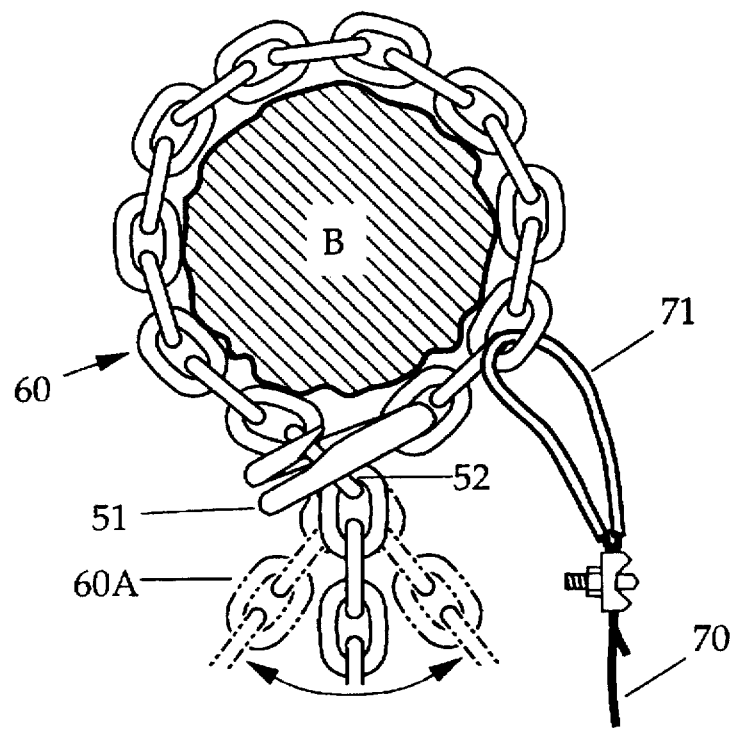
Figure 13D:
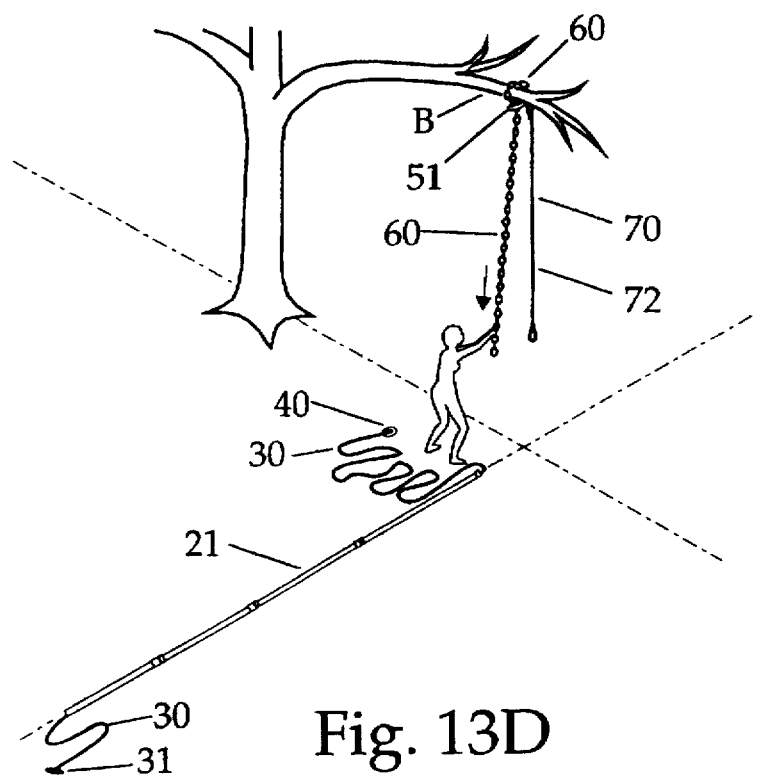

With the running closed loop now formed as shown in FIG. 13A, hoist line 30 is again grasped with both hands and pulled downward. As hoist line 30 is pulled down, running loop collar 51 slides up hoist line 30, over closeable fastener 40, and onto support cable 60. Running loop collar 51 then continues to ascend, sliding up support cable 60, as shown in FIG. 13B, until the running closed loop closes around tree branch B as shown in FIG. 13C. As running loop collar 51 ascends, the bottom end of support cable 60 descends until it is within the reach of an adult human standing on the ground. Closeable fastener 40 is disconnected from the bottom end of support cable 60. Support cable 60 is then grasped firmly in both hands as shown in FIG. 13D and yanked hard several times to tighten the running closed loop securely around tree branch B.

An important and unique advantage accrues in the preferred embodiment of my portable tree swing system through the use of ⁵⁄₁₆" zinc-plated steel proof-coil chain 60A as the top portion of support cable 60 in combination with the ⅛"×2" inside diameter galvanized steel lap link serving as running loop collar 51. As shown previously in FIG. 13C, the ⁵⁄₁₆" chain 60A forms a hinge 52 where the chain emerges from the bottom of running loop collar 51. The purpose for subdividing support chain 60 into three elements can now be understood. A ⁵⁄₁₆" steel chain is very strong and durable and is therefore ideal for resisting the wear and tear inherent in the operation of hinge 52. As described previously, the ⁵⁄₁₆" chain 60A should be of sufficient length to wrap completely around the largest diameter tree branch on which it is intended to be installed, with approximately 1 ft. of chain to spare. This will prevent hinge 52 from forming on the ³⁄₁₆" steel chain 60C which is less durable than the ⁵⁄₁₆" chain 60A. Hinge 52 can form at any point along chain 60A, except near its bottom end where it attaches to steel lap link 60B, thereby accommodating tree branches of various diameters. However, because ⁵⁄₁₆" steel chain is too heavy and expensive to be used for the entire length of support cable 60, the balance of the support cable is made from ³⁄₁₆" zinc-plated steel proof-coil chain 60C. The ⁵⁄₁₆" chain 60A and ³⁄₁₆" steel chain 60C are joined with the ¼"×1¼" zinc-plated steel lap link 60B.

Another advantage accrues with the use of zinc-plated steel proof coil chain in the preferred embodiment of support cable 60. Zinc-plated steel provides a smooth, non-abrasive, non-corrosive surface which prevents damage to tree branch B during installation, use, and removal of support cable 60.

Step 8.

Figure 14A:
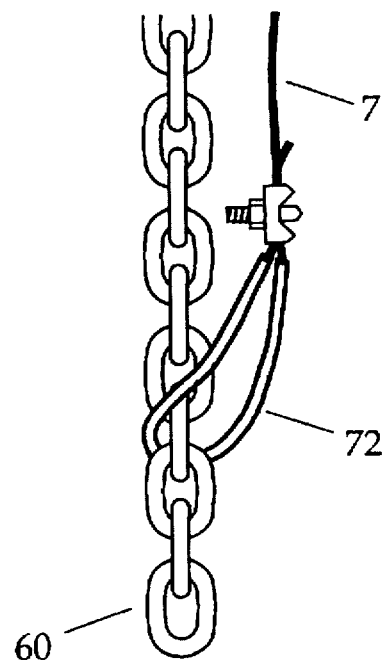
Figure 14B:
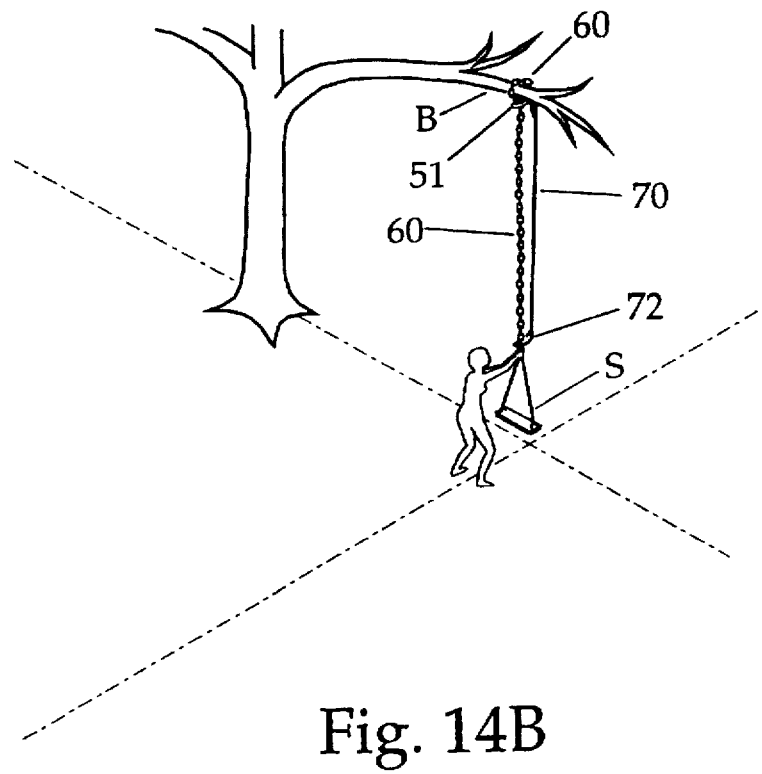

Prior to swinging, the bottom end of support cable 60 is threaded through retrieval cable handle 72 as shown in FIG. 14A. This secures retrieval cable 70 while swinging, preventing it from becoming snagged or entangled in out-of-reach overhanging branches. It is also recommended that, prior to swinging, hoist line placing device 20 be prepared for transport and storage by retracting tubular pole 21 to its shortest length and rewinding hoist line 30 back onto spool 31. A conventional swing, swing-like amusement device, or article of hanging furniture S may now be attached to the bottom end of the support cable 60 as shown in FIG. 14B. For a portable tree swing, this attachment is best made by using any of the variety of common closeable metal fasteners (i.e., quick link, safety spring link or carabiner).

Step 9.

After use, support cable assembly 50 is easily removed from tree branch B in a few seconds by an adult human standing on the ground. First, the conventional swing, swing-like amusement device, or article of hanging furniture S is detached from the bottom end of support cable 60. Retrieval cable handle 72 is unthreaded from the bottom end of support cable 60. Retrieval cable handle 72 is then grasped firmly in both hands and yanked hard several times to loosen the running closed loop from tree branch B, as shown in FIG. 15A. As retrieval cable handle 72 is pulled steadily, running loop collar 51 slides down support cable 60, as shown in FIG. 15B, until the bottom end of support cable 60 passes through the running loop collar 51. This causes the running closed loop to come apart. Pulling on retrieval cable handle 72 continues until support cable 60 slides off the tree branch B and support cable assembly 50 falls to the ground. To prevent injury, care must be taken that no person is standing directly under support cable assembly 50 while it is being removed from tree branch B. The retrieval cable is an important and unique aspect of my portable tree swing system.

Description and Operation—Alternative Embodiments

Additional embodiments of tubular pole 21, although probably more expensive to manufacture than the preferred embodiment, are made of fiberglass or another suitable lightweight, yet strong, and preferably insulating material. The telescoping sections 21A, 21B, 21C, and 21D preferably include conventional locking detents or other conventional means for releasably locking adjacent sections in their extended positions. The number of telescoping segments may vary. It will be understood, however, that tubular pole 21 could be comprised of a variable number of separate and detached one-piece segments designed to be fastened together end-to-end. These are obvious variants of tubular pole 21 which have adjustable length, and accordingly, are not thought to require special illustration. It is mainly important to note that tubular pole 21 must be extendable to a sufficient length to permit its use by an adult human standing on the ground for positioning the top end of the tubular pole over an out-of-reach tree branch, and must also be retractable to a length convenient for portability.

Many additional embodiments of hoist line 30 and spool 31 are also possible, although they are probably more expensive to manufacture than the preferred embodiments. Hoist line 30 may be made from any suitable flexible, lightweight yet strong, abrasion resistant, and preferably insulating material with a load carrying capacity of at least 50 lbs. Spool 31 may be constructed from any lightweight material suitable for being wound with hoist line 30. Alternately, spool 31 may be comprised of a lightweight winch or fishing reel or the like, with an operating load of at least 50 lbs. Such a device may be mounted to the base of tubular pole 21 so as to allow the spool 31 to feed hoist line 30 directly into and out of the bottom end of tubular pole 21. These are obvious variants of the hoist line 30 and the spool 31, and accordingly are not thought to require special illustration.

The preferred embodiment of support cable assembly 50 is optimized for strength, durability, and weather resistance, and is designed to prevent wear and tear on a tree branch. Other possible embodiments of support cable assembly 50 are so numerous that is not practical to describe them all. However, a sampling of possible embodiments of some of the main components of the support cable assembly 50 are included herein. For example, support cable 60 may be comprised of various combinations of any of several varieties of steel chain, steel cable, rope or strap made from natural fibers or synthetic fibers, elastic tubing, or other suitable flexible material with a load carrying capacity sufficient for safely supporting a large adult human. Running loop collar 51 may be comprised of any of a variety of conventional annular steel replacement links (i.e., lap link or quick link) or clip fasteners (i.e., safety spring link or carabiner). Less conveniently, running loop collar 51 may simply comprise a closed loop integrally formed at the top end of the support cable 60 wherein the loop is formed from the support cable material itself and secured with an appropriate fastener or knot. However, this would require hoist line 30 to first be completely unwound from spool 31 and withdrawn from tubular pole 21 before the end of hoist line 30 could be threaded through running loop collar 51.

Retrieval cable 70 may be comprised of any of several varieties of steel chain, steel cable, rope or strap made from natural fibers or synthetic fibers, or other suitable flexible but inelastic materials with a load carrying capacity sufficient to withstand pulling a securely installed support cable assembly 50 from a tree branch.

Conclusion, Ramifications, and Scope

Thus, the reader will see that my portable tree swing system is easily carried by one person, and can be quickly and easily installed on and removed from high, out-of-reach tree branches by an adult human while standing on the ground. Its construction is simple and it is comprised of inexpensive, light-weight materials which are also strong, durable, and weather resistant. Such construction and materials make my invention appropriate for permanent tree swing installations, as well as for portable use. The operation of the portable tree swing system is simple and safe, and does not require the operator to have any extraordinary skill or training. It is fully adjustable, allowing it to be installed on out-of-reach tree branches of various diameters and heights. My portable tree swing system is designed to safely carry the weight of a large adult human. When combined with any conventional swing, swing-like amusement device, or article of hanging furniture, it renders such apparatuses portable and allows them to be suspended from high, out-of-reach tree branches. Thus my invention can be enjoyed by people of all ages. Furthermore, my portable tree swing system has the following additional advantages in that:

- it eliminates the use of permanently installed anchors for attaching support cables to a tree branch, simplifying the tree swing installation process and preventing damage to the tree;
- it is the first portable tree swing system to use the running closed loop method for attaching support cables to a tree branch, a method which is as secure as any permanently installed anchor, and which also simultaneously eliminates the slipping and abrasion between a support cable and the branch which are inherent in simple closed loop or open loop methods;
- it eliminates the use of throwing methods, ladders, and tree climbing to install support cables on high, out-of-reach tree branches, using instead an elongated tubular pole coaxially threaded with a light-weight hoist line to place the hoist line over the tree branch which is then used to hoist the support cable into position;
- it shields the hoist line from becoming snagged or entangled in small tree branches while it is being positioned on the tree branch by feeding the hoist line through the elongated tubular pole;
- it provides for a running closed loop to be quickly and easily formed by threading the hoist line into the running loop collar through an opening or slot in the annulus of the running loop collar at a convenient point midway along the hoist line, thereby eliminating the tedious and unnecessary task of unwinding the hoist line from the spool and back-threading it from the tubular pole; and
- it provides a retrieval cable by which the support cable can be remotely removed, quickly and easily, from high, out-of-reach tree branches by an adult human standing safely on the ground.

While the above description contains many specifics, these should not be construed as limitations on the scope of the invention, but rather as exemplification of one preferred embodiment thereof. Many other variations are possible and are not considered important enough to show in the drawings or describe in detail in the above description. Some examples are given below.

The tubular pole may be constructed from any plastic, fiberglass, composite, or another suitable lightweight material which is strong, rigid, and preferably insulating. Light-weight metals may also be used, although their electric conductivity can be hazardous if the tubular pole comes in contact with overhead electrical wires. The cross-sectional shape of the tubular pole can be circular, oval, irregularly curved, square, triangular, or otherwise polygonal with any number of sides. To maintain the property of portability, the tubular pole must be both extendible and retractable, and may therefore be comprised of a series of rigid tubular segments which are telescopic, detachable, or foldable at the joints. Alternatively, the tubular pole may be comprised of an integral length of any tubular material or combination of materials having the properties of being alternately rigidly extended and then flexibly folded, coiled, or deflated for transport. While the construction of the tubular pole must always be lightweight enough and retractable to a length short enough to be conveniently carried by one person, the pole in its extended state may be of any length and diameter which are allowed by the properties of the materials used in its construction. Any conventional tubular pole designed for use in other fields which satisfies the all of the above criteria may also be incorporated into my portable tree swing system.

The hoist line may be made from any suitable flexible, lightweight yet strong, abrasion resistant, and preferably insulating material with a load carrying capacity sufficient for hoisting the support cable assembly over a tree branch. Such materials include line, cord, rope, and strap materials which are woven or braided from natural or synthetic fibers, and monofilament line made from synthetics, fiberglass or other composites. Monofilament metal wire, or rope or cable woven or braided from metal wire may also be used, although their electric conductivity can be hazardous. The hoist line may be wound on any convenient spool. The spool may be detached, detachable, or integral with the tubular pole. It may be unwound and rewound manually, or may comprise a mechanical device for unwinding and rewinding such as any lightweight winch, fishing reel or similar mechanism with an operating load sufficient for rewinding the hoist line as it hoists the support cable assembly over a tree branch.

The support cable assembly, which includes the running loop collar, the support cable, and the retrieval cable, may be constructed from a large variety of materials in various combinations, or may be integrally constructed from a single material.

The support cable may be constructed from any suitable flexible, strong, abrasion resistant material with a load carrying capacity sufficient for carrying the weight of a large adult human, but it must also be light-weight enough to be carried by one person. Such materials include rope or strap which is woven or braided from natural or synthetic fibers or composites, cable which is woven or braided from metal wire, chain which is comprised of metal or composite links, or elastic tubing, straps, or bungi cord. The support cable may be of any length which is allowed by the properties of the materials used in its construction, but it must be long enough to be within the reach of an adult human when the support cable is installed on the highest intended tree branch.

The running loop collar may be comprised of a any of a variety of common steel replacement links (i.e., lap link or quick link) or clip fasteners (i.e., safety spring link or carabiner). Any such replacement link must have an inside diameter sufficient for the support cable to pass through, and must provide an opening or gap in its annulus through which the hoist line may be threaded into the running loop collar at a convenient point midway along the hoist line. Alternatively, the running loop collar may be comprised of a closed loop integrally formed at one end of the support cable with an inside diameter sufficient for the support cable to pass through, although such a running loop collar is not as convenient for threading the hoist line into.

The retrieval cable may be comprised of any suitable flexible but inelastic material with a load carrying capacity sufficient to withstand the force required to pull a securely installed support cable assembly from a tree branch, which force is less than the full weight of an average adult human. Such materials include line, cord, rope, and strap which is woven or braided from natural or synthetic fibers, monofilament line which is made from plastic, fiberglass or other composites, monofilament metal wire, cable which is woven or braided from metal wire, and chain which is comprised of metal or composite links. The retrieval cable may be of any length which is allowed by the properties of the materials used in its construction, but must be long enough to be within the reach of an adult human when the support cable is installed on a tree branch.

My portable tree swing system may be adapted, in whole or in part, to many other uses, including but not limited to the stringing of interior or exterior electrical and telecommunications cables, mooring boats, pruning trees, general tree care, logging, and any other similar activity which requires a cord, line, rope, wire, cable, chain, or the like to be remotely passed over an out-of-reach overhead object, such as a tree branch. Likewise, my portable tree swing system may be adapted, in whole or in part, for remotely attaching a support cable to and removing it from an out-of-reach overhead object.

Accordingly, the scope of the invention should be determined not by the embodiment illustrated, but by the appended claims and their legal equivalents.

What is claimed:

1. A method for remotely attaching a support cable assembly to an overhead object which is out of the reach of an adult human standing on the ground, and remotely removing said support cable assembly from said overhead object, comprising the steps of:

(a) placing a hoist line over said overhead object with a supply of said hoist line disposed on the ground on one side of said overhead object and the free end of said hoist line disposed on the ground on the opposite side of said overhead object;

(b) attaching said free end of said hoist line to the bottom end of a support cable of said support cable assembly, said support cable being disposed on the ground on said opposite side of said overhead object;

(c) pulling downward on said hoist line disposed on said one side of said overhead object to hoist said bottom end of said support cable upward on said opposite side of said overhead object, then across the top side of said overhead object, and finally downward on said one side of said overhead object until the top end of said support cable is hoisted upward on said opposite side of said overhead object and disposed conveniently at about the eye level of an adult human standing on the ground;

(d) threading said hoist line disposed on said one side of said overhead object through a running loop collar of said support cable assembly to form a running closed loop disposed around said overhead object, said running loop collar being adjoined to said top end of said support cable;

(e) pulling downward again on said hoist line disposed on said one side of said overhead object so that said running loop collar slides upward on said hoist line and onto said bottom end of said support cable and continues to slide upward on said support cable until said running closed loop closes tightly around said overhead object, thus completing the attachment of said support cable assembly to said overhead object; and (f) pulling downward on the lower end of a retrieval cable of said support cable assembly, the upper end of said retrieval cable being attached near to said top end of said support cable at a predetermined distance below the point where said running loop collar adjoins said support cable, thereby causing said running loop collar to slide downward on said support cable until said bottom end of said support cable slides out of said running loop collar, causing said running closed loop to come apart and allowing said support cable assembly to be pulled from said overhead support downward to the ground, thus completing the removal of said support cable assembly from said overhead object; whereby a portable swing selected from a group consisting of portable swing seats and portable swinging amusement devices and articles of portable hanging furniture is quickly and easily attached to and removed from said overhead object by an adult human while standing on the ground.

2. The method according to claim 1 further including a method for placing said hoist line over said overhead object by means of a hoist line placing device, said method comprising the steps of:

(a) grasping a tubular pole at its bottom end, said tubular pole being coaxially threaded with said hoist line such that said supply of said hoist line is disposed at said bottom end of said tubular pole and said free end of said hoist line is disposed at the top end of said tubular pole, with said host line being freely feedable through said tubular pole;

(b) manipulating said tubular pole to position said top end of said tubular pole above said overhead object, with said bottom end of said tubular pole disposed below and on said one side of said overhead object, and said top end of said tubular pole disposed above and on said opposite side of said overhead object, with said free end of said hoist line extending downward from said top end of said tubular pole on said opposite side of said overhead object;

(c) feeding said hoist line through said tubular pole with a line feeding means so that said supply of said hoist line feeds continuously into said bottom end of said tubular pole and out of said top end of said tubular pole causing said free end of said hoist line to descend to the ground on said opposite side of said overhead object; and (d) lowering said tubular pole to the ground so that said supply of said hoist line continues to feed into said bottom end of said tubular pole and out of said top end of said tubular pole until the full length of said tubular pole is disposed on the ground below and on said one side of said overhead object;

whereby said hoist line is placed over said overhead object with said supply of said hoist line disposed on the ground on one side of said overhead object and said free end of said hoist line disposed on the ground on said opposite side of said overhead object.

3. The method according to claim 2 wherein said hoist line feeding means comprises a weight means of predetermined weight attached to said free end of said hoist line so that gravity causes said weight to descend to the ground on said opposite side of said overhead object, whereby said free end of said hoist line is pulled downward to the ground.

4. The method according to claim 3 further including a method by which said weight means is attached to said free end of said hoist line by means of a closable fastener of a predetermined size to prevent said closeable fastener from being pulled into said top end of said tubular pole, whereby said weight means is quickly and easily attached to and detached from said free end of said hoist line.

5. The method according to claim 1 wherein said hoist line is inserted into said running loop collar at a point midway along the length of said hoist line, said hoist line being threaded into said running loop collar by means of an opening or slot in the annulus of said running loop collar, whereby said hoist line is threaded through said running loop collar without first unwinding said supply of said hoist line from a line storage device and unthreading said hoist line from a tubular pole.

6. A portable tree swing system comprising in combination:

a. a hoist line placing device adapted for remotely placing a hoist line over an overhead object which is out of the reach of an adult human standing on the ground, comprising:

(i) a rigid tubular pole of predetermined length sufficient to allow an adult human to position the top end of the tubular pole above said overhead object while grasping said tubular pole at its bottom end, said tubular pole having an inside diameter of predetermined size to allow said hoist line to feed coaxially through said tubular pole;

(ii) said hoist line of predetermined length and threaded coaxially through said tubular pole with a supply of said hoist line disposed at said bottom end of said tubular pole, the free end of said hoist line disposed at said top end of said tubular pole, and the length of said hoist line being freely feedable through said tubular pole; and (iii) a line feeding device connected to said hoist line for feeding said hoist line through said tubular pole so that said hoist line feeds continuously into said bottom end of said tubular pole and out of said top end of said tubular pole;

whereby an adult human standing on the ground can remotely place said hoist line over said overhead object for the purpose of releasably attaching a support cable assembly to said overhead object, and b. a support cable assembly adapted for being remotely attached to and removed from an overhead object which is out of the reach of an adult human standing on the ground, comprising:

(i) a support cable of predetermined strength to carry a live load which is greater than or equal to the live load of a large adult human while swinging, and said support cable also of predetermined length so that, when its top end is attached to said overhead object, its bottom end is within the reach of an adult human standing on the ground;

(ii) a running loop collar adjoining the top end of said support cable, said running loop collar having a predetermined inside diameter such that said support cable is freely feedable therethrough, and said running loop collar also having an opening or slot of predetermined size in its annulus for the purpose of threading a hoist line thereinto at a point midway along the length of said hoist line; and (iii) a retrieval cable attached at its upper end to said support cable at a predetermined distance below the point where said running loop collar adjoins said support cable, said retrieval cable being of predetermined strength to carry a dead load which is less than or equal to the weight of an adult human, and said retrieval cable also being of predetermined length so that its lower end is within the reach of an adult human standing on the ground when said top end of said support cable is attached to said overhead object;

whereby a portable swing selected from a group consisting of portable swing seats and portable swingable amusement devices and articles of portable hanging furniture is suspended from said overhead object for the purpose of supporting the weight of a large adult human while swinging on said portable swing.

7. The system according to claim 6 wherein said tubular pole comprises a plurality of tubular sections selected from a group consisting of telescopic sections and detachable sections and sections connected at foldable joints, whereby said tubular pole is made extendible and retractable for the purpose of portability.

8. The system according to claim 7 wherein said tubular pole is constructed from conventional polyvinylchloride pipes and components of predetermined sizes and with predetermined modifications.

9. The system according to claim 6 further including a line storage device for storing wound coils of said supply of said hoist line thereon, said line storage device selected from a group consisting of simple spools and conventional winches and conventional reels, whereby said hoist line is conveniently stored for the purpose of portability.

10. The system according to claim 9 wherein said line storage device comprises a means for unwinding and rewinding said hoist line so that said hoist line is freely feedable through said tubular pole by said line feeding device, said means for unwinding and rewinding selected from a group consisting of manual means and mechanical means.

11. The system according to claim 9 wherein said line storage device is disposed relative to said bottom end of said tubular pole in a manner selected from a group consisting of detached and detachable and integrally attached.

12. The system according to claim 6 wherein said line feeding device comprises a weight means of predetermined weight attached to said free end of said hoist line whereby gravity causes said weight means to descend to the ground on said opposite side of said object, thereby pulling said free end of said hoist line downward to the ground.

13. The device according to claim 12 further including a closable fastener for attaching said weight means to said free end of said hoist line, said closable fastener being of a predetermined size to prevent said closeable fastener from being pulled into said top end of said tubular pole, whereby said weight means is quickly and easily attached to and detached from said free end of said hoist line.

14. The system according to claim 6 wherein said running loop collar comprises a steel lap link of predetermined size with a slot through which said hoist line is threadable into said lap link.

15. The system according to claim 6 wherein said running loop collar comprises a closeable fastener of annular shape selected from a group consisting of quick links and spring links and clip fasteners and carabiners, said closeable fastener with an opening or gap through which said hoist line is threadable into said running loop collar.

16. The system according to claim 6 wherein said running loop collar comprises a simple closed loop of predetermined size integrally formed at said top end of said support cable.

17. The system according to claim 6 further including a handle means attached to said lower end of said retrieval cable.

18. The system according to claim 6 further including a handle means integrally formed from the material of said retrieval cable at said lower end of said retrieval cable.

* * * * *